United States Patent [19]
Hasushita

[11] Patent Number: 6,115,182
[45] Date of Patent: Sep. 5, 2000

[54] REAL-TIME OPTICAL FINDER SYSTEM

[75] Inventor: Sachio Hasushita, Saitama, Japan

[73] Assignee: Asahi Kogaku Kogyo Kabushiki Kaisha, Tokyo, Japan

[21] Appl. No.: 09/287,645

[22] Filed: Apr. 7, 1999

[30] Foreign Application Priority Data

Apr. 8, 1998 [JP] Japan .................................. 10-096188

[51] Int. Cl.$^7$ ........................... G02B 27/10; G02B 23/00; G02B 25/00
[52] U.S. Cl. ........................ 359/618; 359/432; 359/643; 359/644; 359/645
[58] Field of Search .................................. 359/618, 432, 359/643, 644, 645

[56] References Cited

U.S. PATENT DOCUMENTS

| | | | |
|---|---|---|---|
| 5,434,636 | 7/1995 | Hasushita et al. | 354/219 |
| 5,694,244 | 12/1997 | Abe et al. | 359/432 |
| 5,726,799 | 3/1998 | Abe et al. | 359/431 |
| 5,739,956 | 4/1998 | Ohtake | 359/643 |
| 5,752,107 | 5/1998 | Hasushita et al. | 36/296 |
| 5,926,318 | 7/1999 | Hebert | 359/618 |

FOREIGN PATENT DOCUMENTS 9-113962  2/1997  Japan .

*Primary Examiner*—Georgia Epps
*Assistant Examiner*—Michael A. Lucas
*Attorney, Agent, or Firm*—Greenblum & Bernstein, P.L.C.

[57] ABSTRACT

A real-image finder optical system includes a positive objective optical system, an image-erecting optical system and an eyepiece optical system, in this order from the object. The image-erecting optical system includes a pattern display surface having a reflective pattern, and a half mirror surface, transmitting a portion of the light rays incident from the object, and again reflecting the light rays having been reflected from the pattern display surface. The real-image finder optical system forms a real image of the object formed through the objective optical system and a virtual image of a pattern on the pattern display surface formed by an optical system including the half mirror surface so that an operator can simultaneously view both the real image of the object and the virtual image of the pattern through the eyepiece optical system; and the real-image finder optical system satisfies the condition:

$$0 < d_1/f_e \leq 0.1 \quad (1)$$

wherein $d_1$ designates the equivalent air thickness along the optical axis from the pattern display surface to the surface of the eyepiece optical system closest to the object; and $f_e$ designates the focal length of the eyepiece optical lens system.

11 Claims, 26 Drawing Sheets

Fig. 7
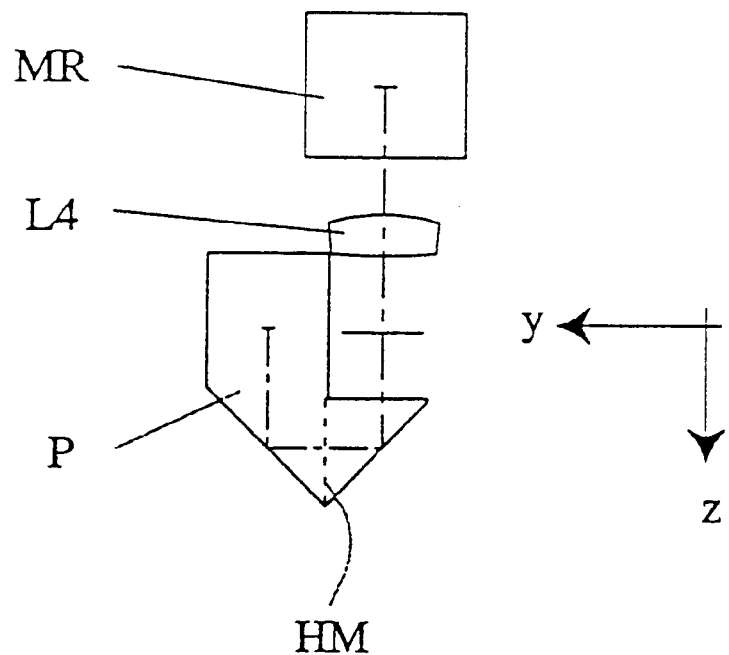
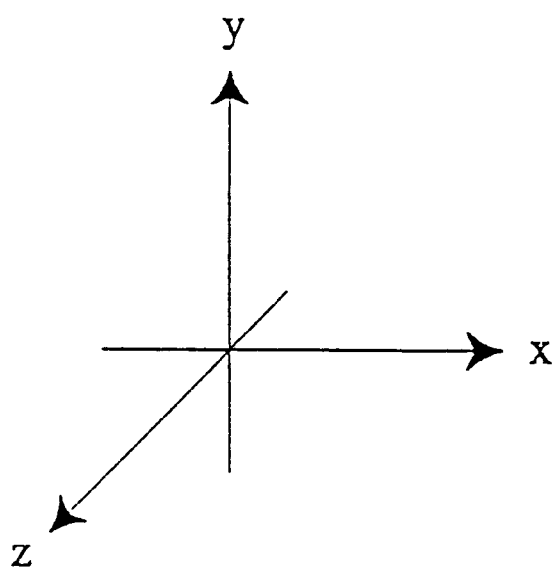

SPHERICAL
ABERRATION
AXIAL
CHROMATIC
ABERRATION
φ = 7.3

-0.50  0.50
DIOPTER
——— d
—·—·— g
— — — C

FIELD
CURVATURE
β = 11.0°

-0.50  0.50
DIOPTER
——— S
········ M

DISTORTION
β = 11.0°

-5.00  5.00
%

LATERAL
CHROMATIC
ABERATION
β = 11.0°

-0.05  0.05
DEGREE
——— d
—·—·— g
— — — C

SPHERICAL
ABERRATION
AXIAL
CHROMATIC
ABERRATION
φ = 6.0

-0.50  0.50
DIOPTER
——— d
-·-·-·- g
-·-·-·- C

FIELD
CURVATURE
β = 11.0°

-0.50  0.50
DIOPTER
——— S
-------- M

DISTORTION
β = 11.0°

-5.00  5.00
%

LATERAL
CHROMATIC
ABERATION
β = 11.0°

-0.05  0.05
DEGREE
——— d
-·-·-·- g
-·-·-·- C

SPHERICAL ABERRATION
AXIAL CHROMATIC ABERRATION
φ = 6.8
-0.50  0.50
DIOPTER
—— d
------ g
— — C

FIELD CURVATURE
β = 11.0°
-0.50  0.50
DIOPTER
—— S
------ M

DISTORTION
β = 11.0°
-5.00  5.00
%

LATERAL CHROMATIC ABERATION
β = 11.0°
-0.05  0.05
DEGREE
—— d
------ g
— — C

SPHERICAL
ABERRATION
AXIAL
CHROMATIC
ABERRATION
φ = 6.0

-0.50  0.50
DIOPTER
——— d
·—·—· g
----- C

FIELD
CURVATURE
β = 11.0°

-0.50  0.50
DIOPTER
——— S
------ M

DISTORTION
β = 11.0°

-5.00  5.00
%

LATERAL
CHROMATIC
ABERATION
β = 11.0°

-0.05  0.05
DEGREE
——— d
·—·—· g
----- C

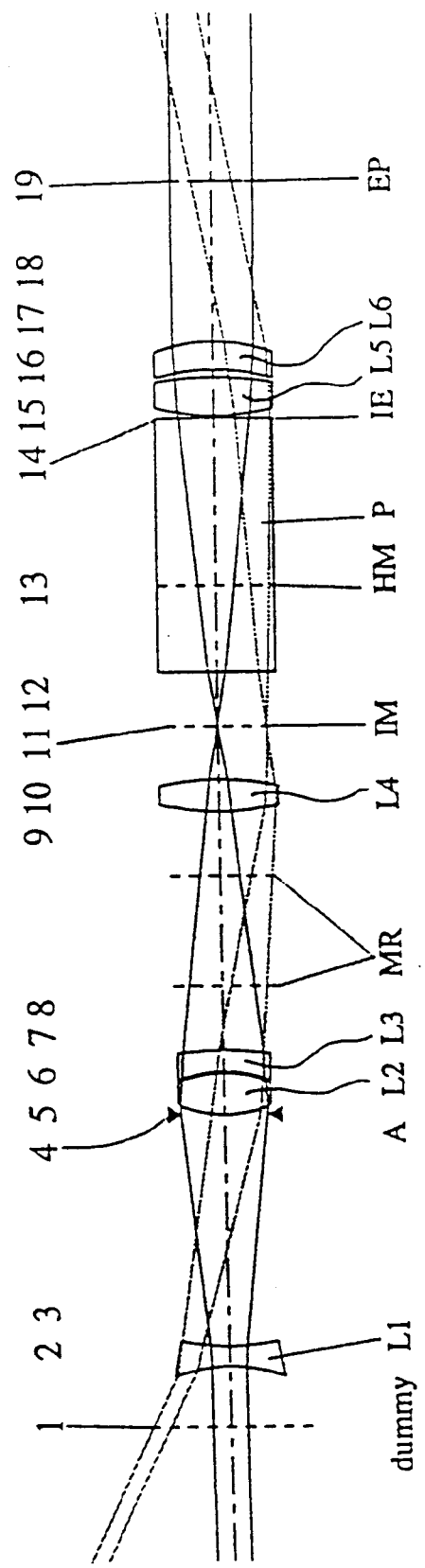

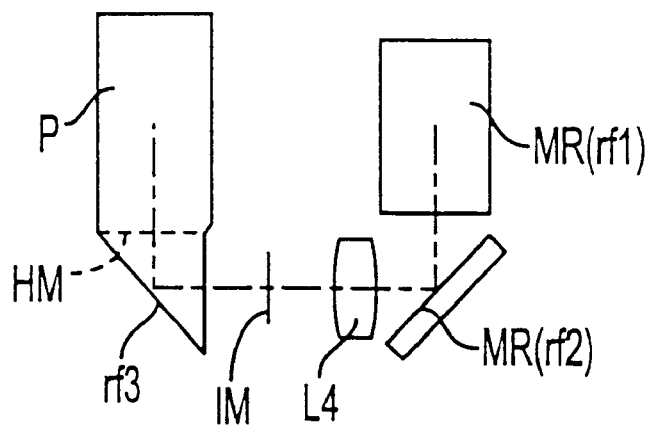
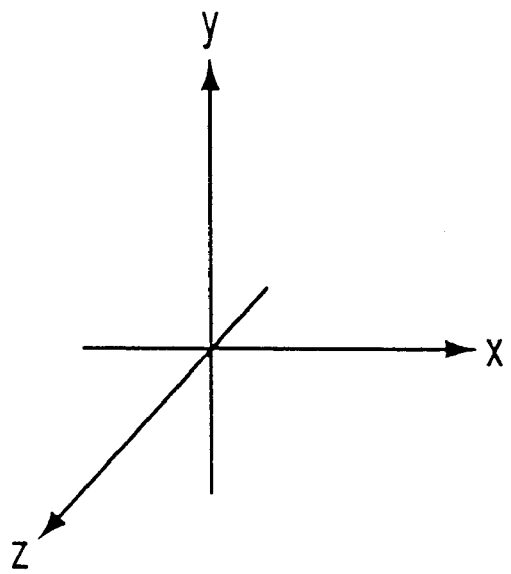
FIG. 25

SPHERICAL
ABERRATION
AXIAL
CHROMATIC
ABERRATION
φ = 6.0

-0.50  0.50
DIOPTER
——— d
------ g
— - — C

FIELD
CURVATURE
β = 11.0°

-0.50  0.50
DIOPTER
——— S
------ M

DISTORTION
β = 11.0°

-5.00  5.00
%

LATERAL
CHROMATIC
ABERATION
β = 11.0°

-0.05  0.05
DEGREE
——— d
------ g
— - — C

REAL-TIME OPTICAL FINDER SYSTEM

BACKGROUND OF THE INVENTION

1. Field of the Invention

The present invention relates to a real-image finder optical system.

2. Description of the Related Art

A real-image finder optical system, provided independently from a photographing optical system in, for example, a compact camera, typically includes an objective optical system having positive power, an image-erecting optical system which erects an inverted image formed through the objective optical system to attain an erect image, and an eyepiece optical system for magnifying and observing the erect image, in this order from the object. Furthermore, in many cameras which include a real-image finder, a display member (field frame member) is provided in the vicinity of the image forming plane of the objective optical system in order to display pattern information, such as a field frame and the like within the finder. In general, a display member is formed to indicate predetermined information, such as a field frame, an object distance measuring zone, photographing modes, other numerical information and the like, in the finder view-field by blocking incident light from the object via non-transparent patterns corresponding to predetermined information formed on a transparent member. An liquid crystal display (LCD) is utilized in order to display variable data.

However, in a real-image finder of the prior art, the display member is located in the vicinity of the image forming plane of the objective optical system, on which a viewer's eye is focused. Therefore, if foreign matter such as dust, sticks to the display member during assembly of the finder, such foreign matter can be easily viewed through the finder. In order to lessen the probability of foreign matter being apparent when viewing through the finder, optical elements are removed from the vicinity of the image forming plane, or the number thereof are reduced. Accordingly, in the prior art, attempts have been made to provide optical elements which constitute an objective optical system or an image-erecting optical system at a distant location from the image forming plane. However, since the finder of the prior art is constructed so that the display member is directly viewed through the eyepiece optical system, in order to clearly observe the pattern information of the display member, the display member has to be close to the image forming plane. Furthermore, the problem of foreign matter obstructing the finder view could not be satisfactorily solved.

Japanese Unexamined Patent Publication No. Hei-9-113962 has disclosed a real-image finder which can display various items of pattern information as a virtual image by utilizing an optical system including a half mirror surface. With such a finder, foreign matter which may have stuck to the display member becomes no longer visible. However, as the eyepiece optical system and the display member are distant from each other, when a viewer observes the finder field-of-view by placing his/her eye distant from the eyepiece optical system, any foreign matter stuck to the display member becomes apparent. Also, due to the focal length of the eyepiece optical system being increased, magnification of the finder is decreased, thereby causing a further problem of the object being more difficult to observe.

It is well known in the art that a half mirror surface for obtaining a virtual image is formed as an emitting surface (a rear reflection surface) of a prism (glass or plastic) where light exits from the inside of the prism to the surrounding air. It is also known that the rear reflection surface is more influenced by the surface precision of the half mirror surface than a typical incident surface (a front reflection surface) where light is incident from the surrounding air to the inside of the prism. The half mirror surface in an embodiment taught in Japanese Unexamined Publication No. Hei-9-113962 is not only formed as a rear reflection surface of a prism, but also is curved.

In such a prism which includes a curved surface, it is conventional to produce the same via injection molding using a plastic material. However, it is extremely difficult to produce a product having a reflection surface with such high precision via an injection molding process. Furthermore, even if a successful molding is made, the plastic material used therefor has a tendency to change a refractive index in the prism, and at the same time, change the shapes of reflection surfaces and light transmitting surfaces according to changes in temperature and humidity. Consequently, it is difficult to maintain the precision of the prism.

According to Japanese Unexamined Publication No. Hei-9-113962, any foreign matter stuck to the display member is not directly visible through the finder. However, since the prism disclosed in this publication contains a half mirror surface in an optical path, the ghost light, scattered from the reflection surfaces thereof and visible in the field-of-view as ghost images, is much more frequently observed than in a real-image finder which does not usually have a half mirror surface. In other words, because of the existence of the half mirror surface, although JUP No. Hei-9-113962 has disclosed the real-image type finder, the ghost light is a problem as in a virtual-image type finder, in particular an Albada type finder, which usually has a half mirror surface in an optical path. It should be understood that if an arrangement of optical elements is similar to that of Japanese Unexamined Publication No. Hei-9-113962, ghost images observed in a virtual-image finder will become a problem.

SUMMARY OF THE INVENTION

It is an object of the present invention to provide a real-image optical finder system having a good viewing quality wherein even if foreign matter, such as dust, sticks to the optical elements which constitute an objective optical system and/or an image-erecting optical system, and to a display member, the foreign matter is not apparent in the field-of-view of the finder.

In order to achieve the above-mentioned object, according to the present invention, there is provided a real-image finder optical system including an objective optical system having positive power, an image-erecting optical system which erects an inverted image formed by the objective optical system and an eyepiece optical system for viewing the erect image which has been erected by the image-erecting optical system, in this order from the object. The image-erecting optical system includes, on the side of the eyepiece optical system behind the image forming plane of the objective optical system, a pattern display surface having a reflective pattern thereon; a half mirror surface provided on the side of the object with respect to the pattern display surface, transmitting a portion of the light rays incident from the object, and again reflecting the light rays which have been reflected from the pattern display surface. The real-image finder optical system is arranged to provide a real image of the object formed through the objective optical system and a virtual image of a pattern on the pattern display surface formed by an optical system including the half mirror surface so that an operator can simultaneously view both the real image of the object and the virtual image of the pattern on the pattern display surface through the eyepiece optical system; and the real-image finder optical system satisfies the following condition:

$$0 < d_1/f_e \leq 0.1 \quad (1)$$

wherein $d_1$ designates the equivalent air thickness along the optical axis from the pattern display surface to the surface of the eyepiece optical system closest to the object; and $f_e$ designates the focal length of the eyepiece optical lens system.

The optical elements of the objective optical system and the image-erecting optical system are preferably provided at positions away from the vicinity of the image forming plane of the objective optical system, and the virtual-image plane of the pattern display surface by the half mirror surface and the image forming plane of the objective optical system are preferably provided at optically equivalent positions with respect to the eyepiece optical system, and the real-image finder optical system satisfies the following condition:

$$0.4 \leq d_2/d_3 \leq 0.6 \quad (2)$$

wherein $d_2$ designates the equivalent air thickness along the optical axis from the half mirror surface to the surface of the eyepiece optical system closest to the object; and $d_3$ designates the equivalent air thickness along the optical axis from the image forming plane of the objective optical system to the surface of the eyepiece optical system closest to the object.

The image-erecting optical system preferably includes a Porro type image-erecting optical system in which the light rays incident from the object are reflected twice in the vertical direction and reflected twice in the horizontal direction so that the inverted image formed by the objective optical system is erected so as to be properly oriented. The Porro type image-erecting optical system preferably includes a prism having a plurality of refection surfaces on the side of the eyepiece optical system behind the image forming plane of the objective optical system, and the pattern display surface is provided on a light transmitting surface (light emitting surface) of the prism, closest to the eyepiece optical system. When the image-erecting optical system includes a prism having three reflection surfaces on the side of the eyepiece optical system behind the image forming plane of the objective optical system, the half mirror surface is preferably formed on a plane which includes the ridge line of the first and second reflection surfaces of the prism and is perpendicular to the optical axis. On the other hand, when the image-erecting optical system includes a prism having two reflection surfaces on the side of the eyepiece optical system behind the image forming plane of the objective optical system, the half mirror surface is preferably formed on a plane which is positioned between the first and the second reflection surfaces and is perpendicular to the optical axis. In either case, the real-image finder optical system satisfies the following condition:

$$1.5 \leq d_2/h \leq 3.5 \quad (3)$$

wherein

"h" designates the longest distance from the optical axis to the most outer periphery of the effective area of the emitted bundle of light rays at the emitting surface of the prism closest to the eyepiece optical system.

In addition to the above, a condenser optical system is preferably provided between the objective optical system and the image forming plane of the objective optical system. Moreover, the half mirror surface is preferably formed as a plane.

Furthermore, it is possible to form the half mirror surface on the contact surfaces of a pair of prisms, where the contact surfaces of the pair of prism are cemented together so as to place the half mirror surface between the contact surfaces to be cemented.

At least between the half mirror surface HM and the pattern display surface IE, along the optical axis, it is preferable to form a black painted finish or a rough finish through which the surface is arranged to make the reflection light therefrom unnoticeable. The edge surfaces are defined as the surfaces of the prism wherein the substantial light paths do not pass through. It should be noted that the above explained harmful light preventing surface is a countermeasure to prevent the ghost light experienced in the real-image type finder of JUP No. Hei-9-113962.

The present disclosure relates to subject matter contained in Japanese Patent Application No. 10-96188 (filed on Apr. 8, 1998) which is expressly incorporated herein by reference in its entirety.

BRIEF DESCRIPTION OF THE DRAWINGS

The invention will be discussed below in detail with reference to the accompanying drawings, in which:

FIG. 7 is a right side elevation of the real-image zoom-finder optical system shown in FIG. 5 when viewed from the side of the eyepiece optical system;

FIG. 20 is a schematic drawing of the third embodiment of the real-image zoom-finder optical system according to the present invention at the wide-angle extremity;

FIG. 25 is a right side elevation of the real-image zoom-finder optical system shown in FIG. 23 when viewed from the side of the eyepiece optical system;

DESCRIPTION OF THE PREFERRED EMBODIMENTS

Figure 1:
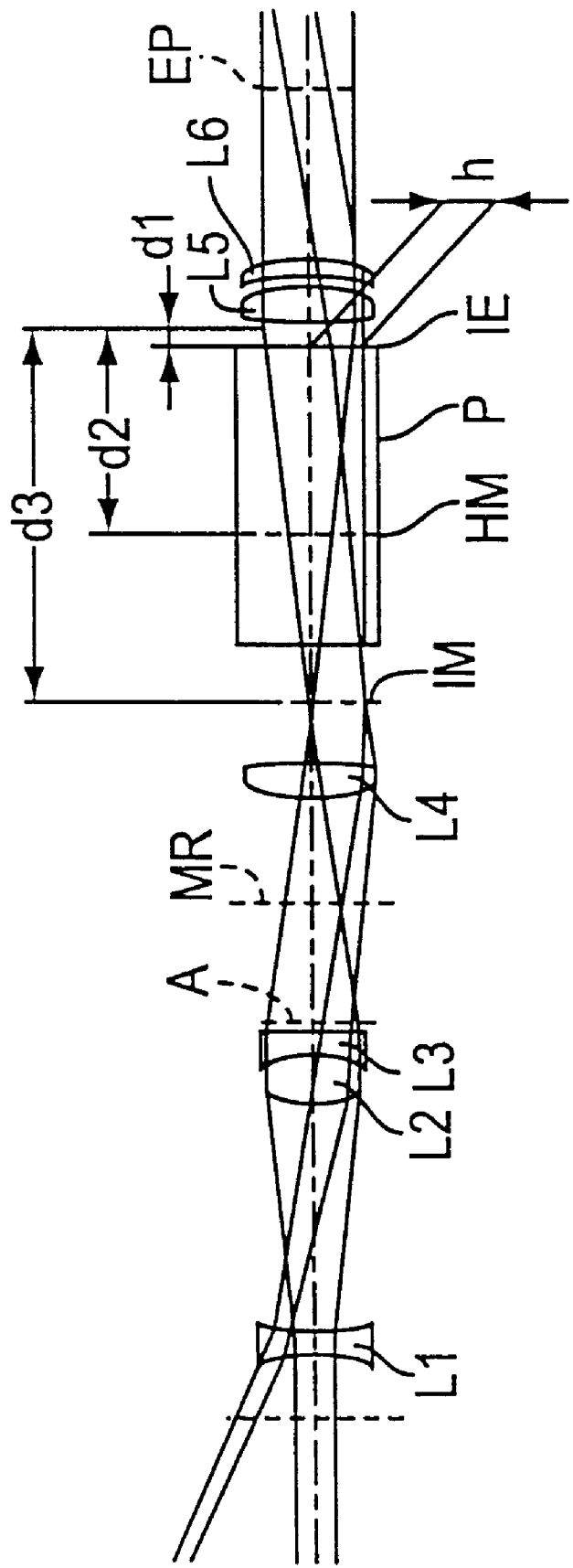
FIG. 1 is a schematic drawing of a real-image finder optical system and the various symbols used in the conditions, according to the present invention.

FIG. 1 is a schematic drawing of a real-image finder optical system with the symbols found in the conditions. In order from the object, there is provided a plurality of lens elements L1, L2, L3, a diaphragm A, a mirror MR constituting a part of an image-erecting optical system, a condenser lens element (a condenser lens optical system) L4, an image forming plane IM of an objective optical system, a prism P having the remaining three reflection surfaces of the image-erecting optical system, and lens elements L5 and L6 constituting an eyepiece optical system. It is noted that the lens elements L1, L2, L3, L4 and the diaphragm A constitute the objective optical system. Within the prism P, there are provided a pattern display surface IE positioned on the side of the eyepiece optical system behind the image forming plane IM, and a half mirror surface HM positioned on the side of the object with respect to the pattern display surface IE. The pattern display surface IE has a reflective pattern, and the half mirror surface HM is arranged to partially transmit incident light from the object, and at the same time, to again reflect light rays reflected from the reflective pattern on the pattern display surface IE. Furthermore, a symbol EP designates an eyepoint.

A pattern on the pattern display surface IE which displays various information such as a field frame in the field-of-view of the eyepiece optical system can be formed by, for example, a metallic coating deposited thereon. A portion of the light from the objective optical system, passing through the half mirror HM, is made incident on the reflective display pattern, and is reflected from the reflective display pattern toward the objective optical system and is again reflected by the half mirror surface HM toward the eyepiece optical system. On the other hand, since the image of the object observed through the objective optical system is formed on the image forming plane IM as a real-image, the user (viewing through the eyepiece optical system) views both the real-image of the object formed through the objective optical system and the virtual image of the finder information pattern superimposed on the real-image.

Condition (1) is provided to attain better viewing of the real-image of the object and the virtual image of the display pattern. If $d_1/f_e$ exceeds the lower limit, a light emitting surface of the image-erecting optical system would physically interfere with the eyepiece optical system; and hence, impossible to construct the real-image finder optical system. If $d_1/f_e$ exceeds the upper limit, the focal length of the eyepiece optical system becomes longer, so that the magnification of the finder is decreased and the field-of-view is reduced; and hence, a finder optical system which has good viewing quality cannot be attained.

In order for foreign matter, such as dust, not to be apparent when viewing through the finder, it is preferable to provide as few optical elements (for example, an objective optical system, a condenser lens optical system or an image-erecting optical system and the like) as possible in the vicinity of the image forming plane IM of the objective optical system. Furthermore, it is preferable that the virtual-image plane of the pattern display surface IE by the half mirror surface and the image forming plane IM of the objective optical system be provided at optically equivalent position with respect to the eyepiece optical system. Condition (2) specifies a lens arrangement wherein the image forming plane IM and the pattern display surface IE are located at the optically equivalent positions as mentioned above.

More concretely, when a diopter value for the virtual-image plane of the pattern display surface IE by the half mirror surface viewed through the eyepiece optical system, and a diopter value for the image forming plane IM of the objective optical system viewed through the eyepiece optical system, are compared, by satisfying condition (2), the diopter value for the former and the diopter value for the latter are made equal to the extent that there is no difficulty in viewing through the eyepiece optical system. If $d_2/d_3$ exceeds the lower limit, the diopter value for the former becomes larger negative value than that of the latter. If $d_2/d_3$ exceeds the upper limit, the diopter value for the former is larger positive value than that of the latter. In either case, as the diopter values are not the same, viewing the virtual-image plane of the pattern display surface IE by the half mirror surface and the image forming plane IM of the objective optical system at the same time is difficult.

An image-erecting optical system, known as a Porro type reflecting optical system, in which the light rays incident from the object are reflected twice in the vertical direction and reflected twice in the horizontal direction so that the inverted image formed by the objective optical system is rotated so as to be properly oriented is well known. A part of or all the reflection surfaces can be constructed from either mirrors or a prism. However, it is preferable that a prism be used, rather than a mirror, for the reflection surfaces on the side of the eyepiece optical system behind the image forming plane IM of the objective optical system. If a prism is used, since the focal length of the eyepiece optical system can be shortened, the magnification of the finder can be increased.

In the case where the four reflection surfaces of the image-erecting optical system are positioned so that one reflection surface is located one side and three remaining surfaces are located on the other side with respect to the image forming plane IM of the objective optical system, it is preferable that the half mirror surface HM be positioned on a plane which includes the ridge line formed by the first and second reflective surfaces behind the image forming plane IM and is perpendicular to the optical axis. Accordingly, the half mirror surface HM does not obstruct any reflection surfaces. If the half mirror surface HM is positioned between the second and third reflection surfaces, it becomes difficult to satisfy condition (2).

On the other hand, in the case where the four reflection surfaces of the image-erecting optical system are positioned so that two surfaces are located on each side of the image forming plane IM of the objective optical system, it is preferable that the half mirror surface HM be placed on a position which includes the ridge line formed by the first reflective surface and an edge surface formed by the second reflective surface and the light emitting surface closest to the eyepiece optical system. Accordingly, the half mirror surface HM does not obstruct any reflection surfaces.

Condition (3) is to attain an image-erecting optical system wherein three reflection surfaces are located on the side of the eyepiece optical system behind the image forming plane IM of the objective optical system, and the light rays that pass through the image forming plane IM of the objective optical system and the light rays reflected from the pattern display surface IE and again reflected by the half mirror HM are adequately incident on the eyepiece optical system. If $d_2/h$ exceeds the lower limit, the size of the image-erecting optical system would have to be larger; and hence, though the light rays will be allowed to easily pass through the image-erecting optical system, the focal length of the eye-piece optical system would have to be increased, reducing the size of the field-of-view, and making viewing therethrough difficult. Furthermore, the camera would have to be enlarged. If $d_2/h$ exceeds the upper limit, the periphery of the field-of-view becomes shaded.

Condition (3) is also utilized to attain an image-erecting optical system wherein two reflection surfaces are located on the side of the eyepiece optical system behind the image forming plane IM of the objective optical system, and the light rays that pass through the image forming plane IM of the objective optical system and the light rays reflected from the pattern display surface IE and again reflected by the half mirror HM are adequately incident on the eyepiece optical system. If $d_2/h$ exceeds the lower limit, the size of the image-erecting optical system would have to be larger; and hence, though the light rays will be allowed to easily pass through the image-erecting optical system, the focal length of the eyepiece optical system would have to be increased, reducing the size of the field-of-view, and making viewing therethrough difficult. Furthermore, the camera would have to be enlarged. If $d_2/h$ exceeds the upper limit, periphery of the field-of-view becomes shaded.

It is preferable that the pattern display surface IE be provided on the surface of the prism closest to the eyepiece optical system. Accordingly, even if foreign matter (such as dust) does stick to the pattern display surface IE, since the pattern display surface IE is extremely close to the eye of the user (photographer), it becomes less likely for the user to notice such foreign matter. The prism of the image-erecting optical system which includes the half mirror surface HM is not formed by an injection molding process using a resin material; rather, the prism is formed from a highly polished optical glass material to make a high precision half mirror surface HM. Furthermore, a stable, good quality field-of-view can be provided without receiving much influence from the photographing environments.

Specific numerical data of the embodiments will be described below via the tables and diagrams; wherein do designates the distance from the object to the first lens surface of the objective optical system, ω designates the real field of view (half amount, °), β designates the apparent visual angle (half amount, °), γ designates the magnification of the finder, m designates the loupe magnification ($250/f_e$, wherein $f_e$ designates the focal length of the eyepiece optical system) of the eyepiece optical system, D designates the diopter, and φ designates the diameter of the exit pupil, r designates the radius of curvature, d designates the lens thickness or distance, $n_d$ designates the refractive index with respect to the d-line, and $v_d$ designates the Abbe number. S designates the sagittal image, and M designates the meridional image. In the columns that indicate lens thickness/distance, if the lens space is variable, the distances are indicated in order from wide to telephoto.

In the diagrams for each embodiment, the data indicated in the column for the reflection system is related to the light path from the pattern display surface IE to the user's eye with regard to the light rays reflected from the pattern display surface IE and then again reflected by the half mirror surface HM.

In addition to the above, an aspherical surface which is symmetrical with respect to the optical axis is defined as follows:

ti $x=Ch^2/\{1+[1-(1+K)C^2h^2]^{1/2}\}=A4h^4+A6h^6+A8h^8+A10h^{10}$;

wherein:

x designates a distance from a tangent plane of an aspherical vertex;

C designates a curvature of the aspherical vertex (1/r);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

A8 designates a tenth-order aspherical coefficient;

First Embodiment

Figure 2:
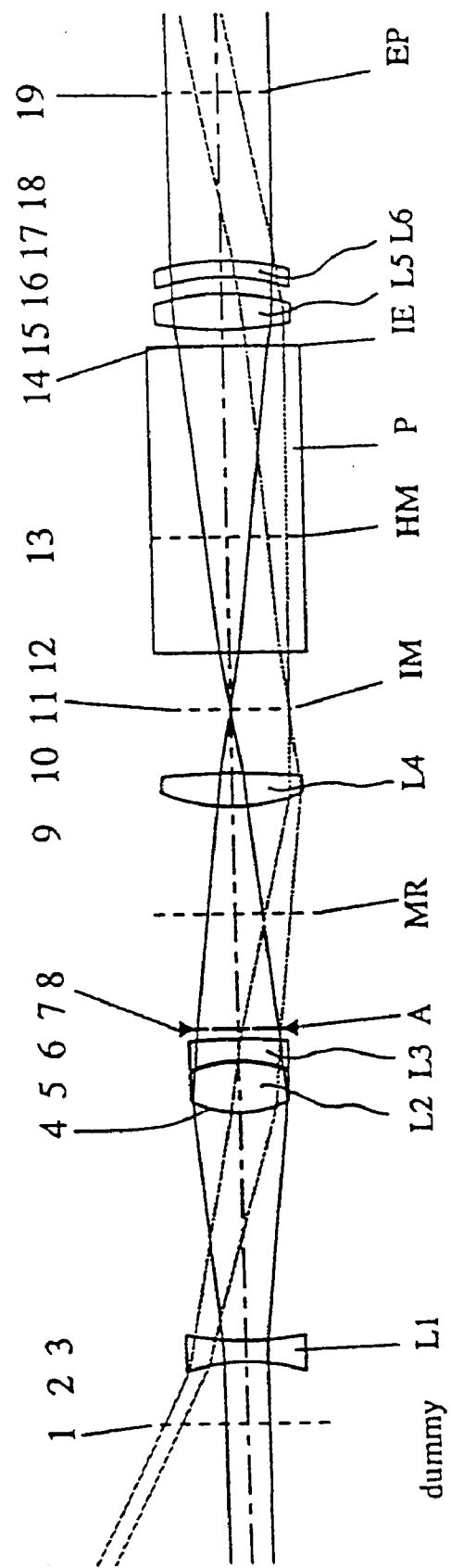
FIG. 2 is a schematic drawing of the first embodiment of the real-image zoom-finder optical system according to the present invention at the wide-angle extremity.
Figure 3:
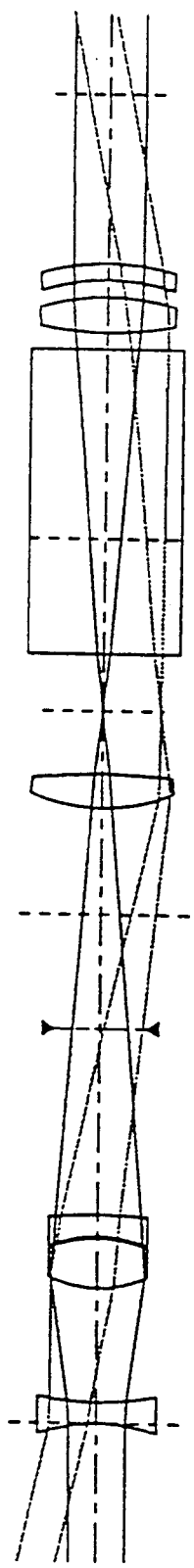
FIG. 3 is a schematic drawing of the first embodiment of the real-image zoom finder optical system according to the present invention at the telephoto extremity.
Figure 4:
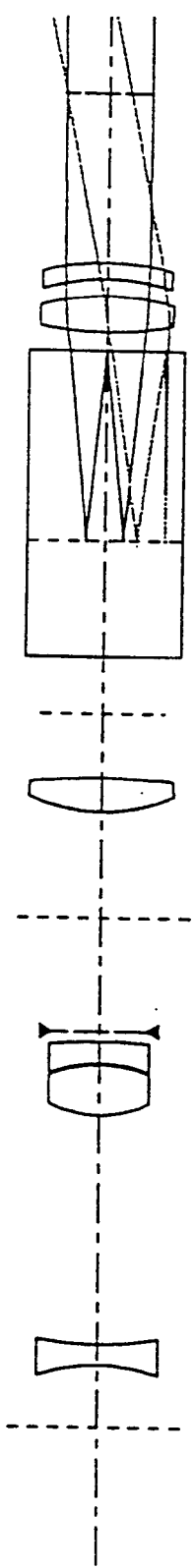
FIG. 4 is a schematic drawing showing light paths coming from the pattern display surface to the eyepoint via the half mirror surface, in the real-image zoom-finder optical system of FIGS. 2 and 3.
Figure 5:
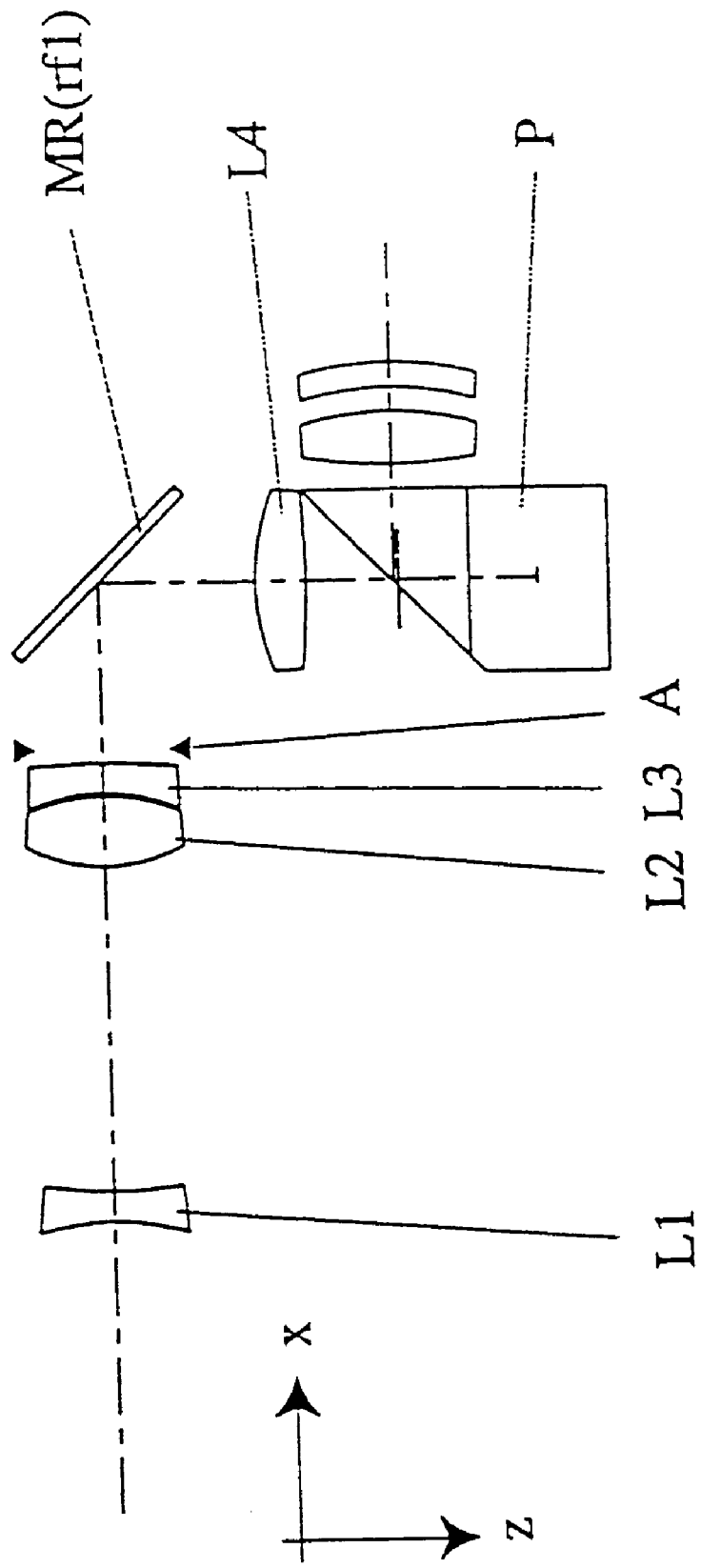
FIG. 5 is a plan view showing a prism provided in the real-image zoom-finder optical system of the first embodiment shown in FIGS. 2 through 4.
Figure 6:
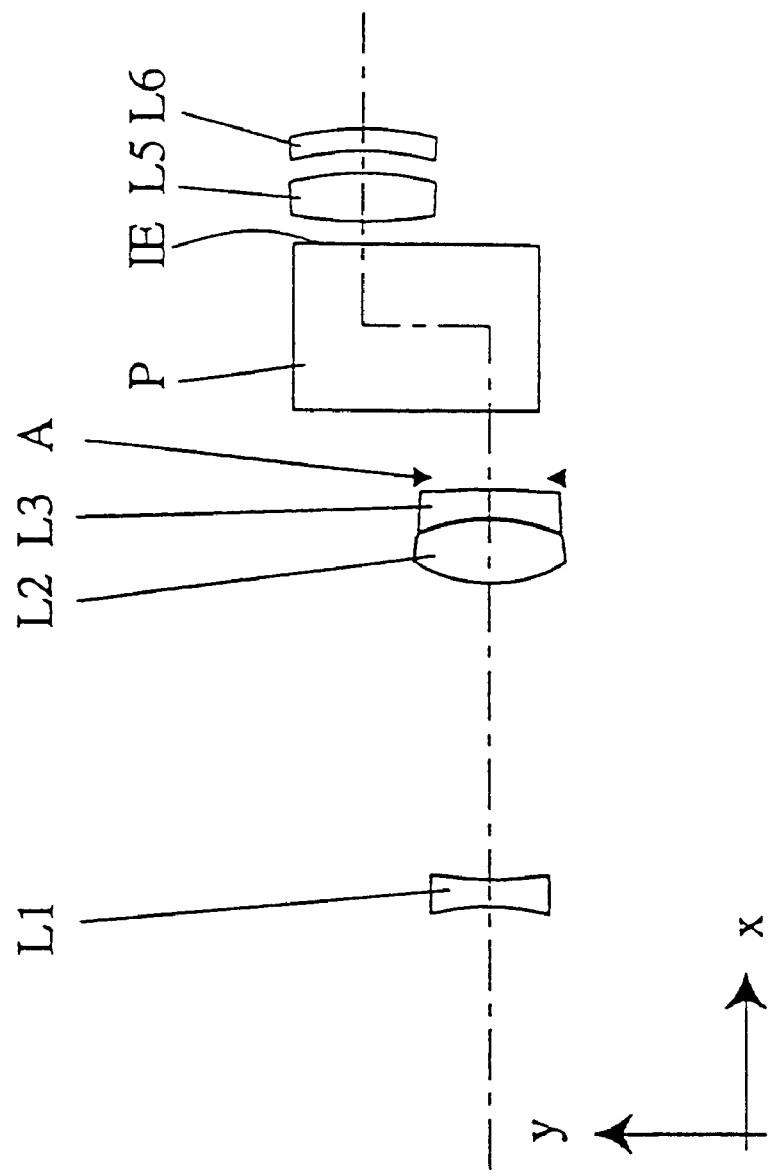
FIG. 6 is a side elevation of the real-image zoom-finder optical system shown in FIG. 5.
Figure 8:
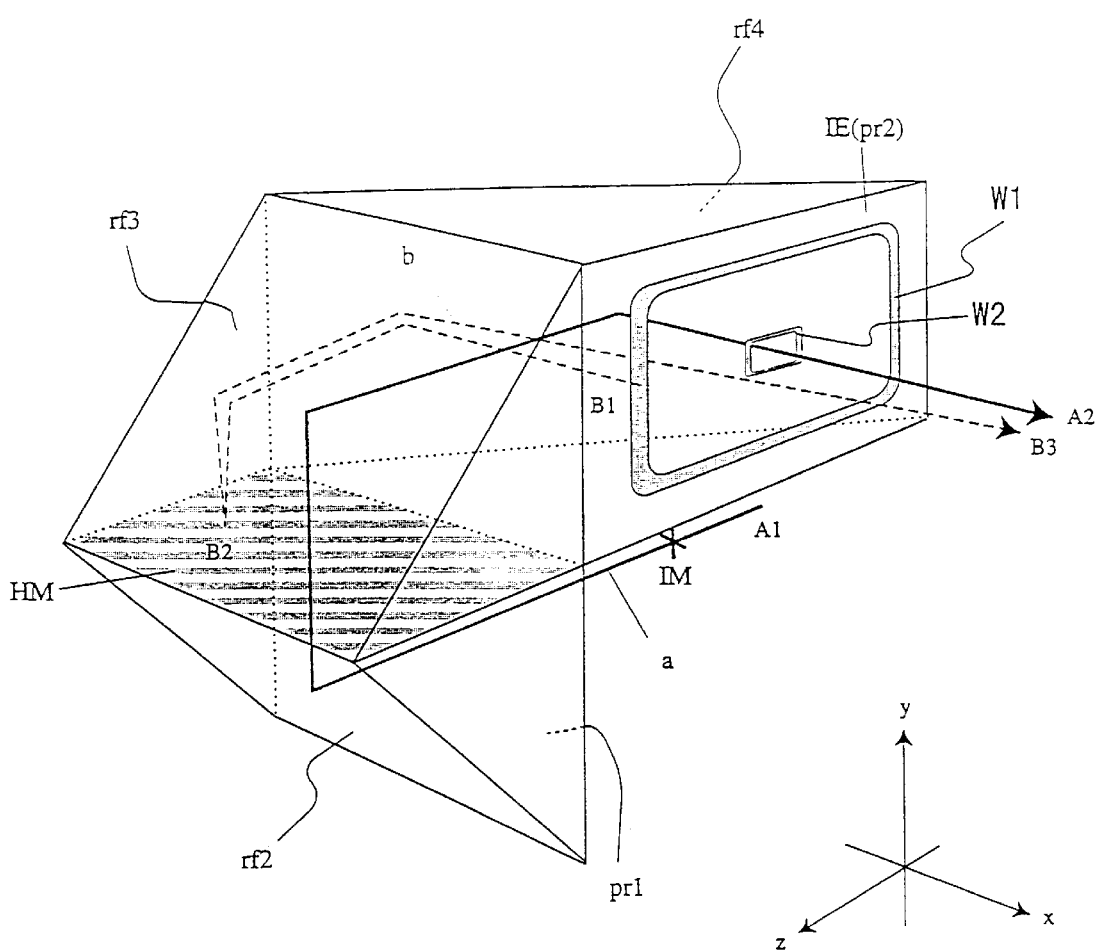
FIG. 8 is a perspective view of a prism used in the first embodiment of FIGS. 5 through 7.
Figure 9:
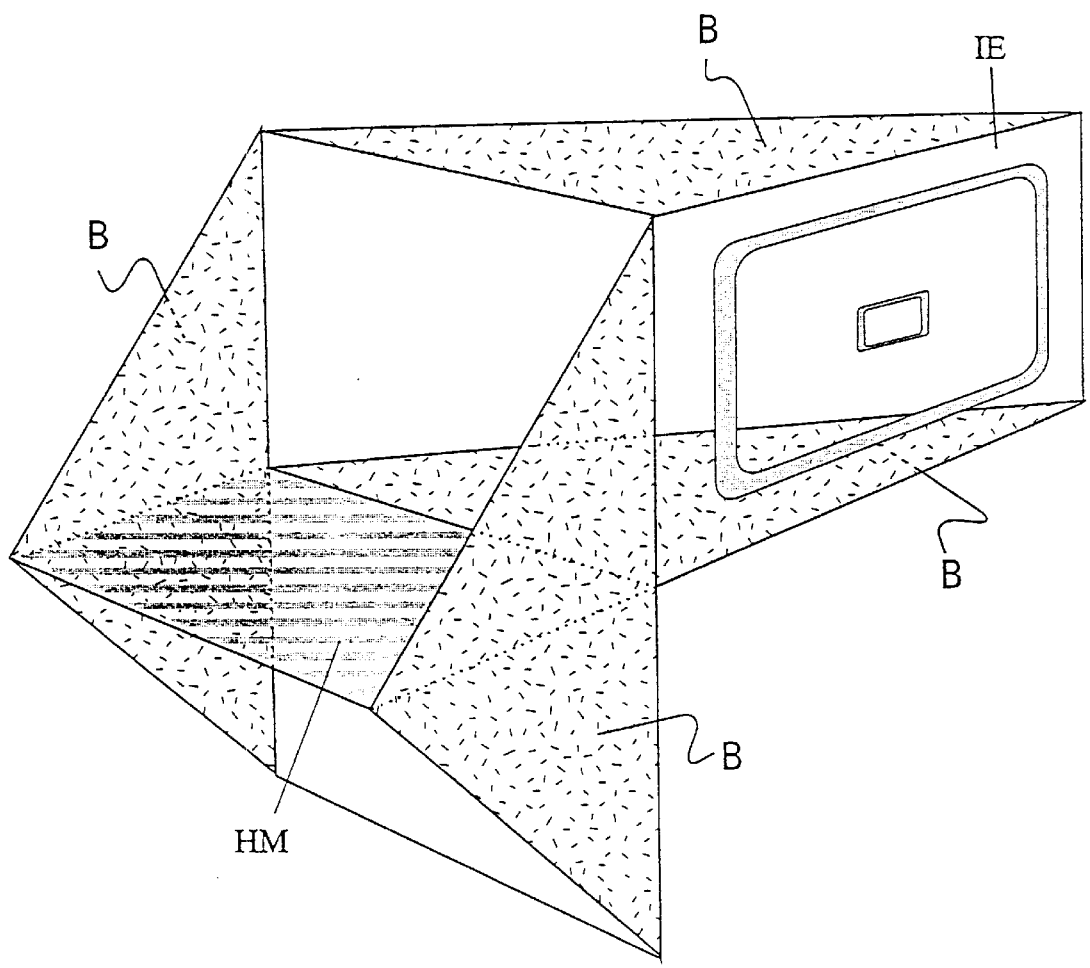
FIG. 9 is a perspective view of the prism of FIGS. 5 through 8 showing a rough finish surface or a black painted finish surface.
Figure 10A:
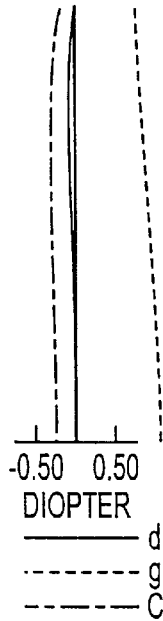
FIGS. 10A, 10B, 10C and 10D show aberration diagrams of the real-image zoom-finder optical system of the first embodiment at the wide-angle extremity shown in FIG. 2.
Figure 10B:
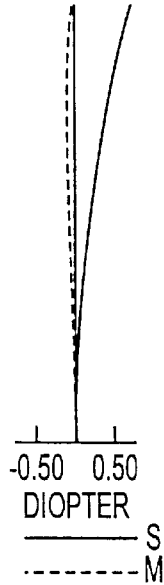
Figure 10C:
Figure 10D:
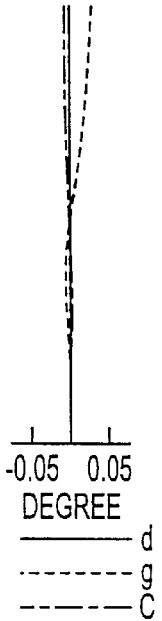
Figure 11A:
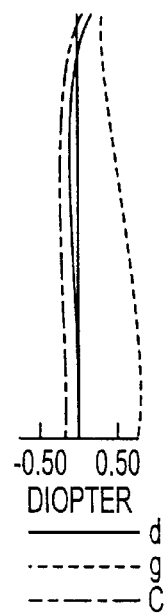
FIGS. 11A, 11B, 11C and 11D show aberration diagrams of the real-image zoom-finder optical system of the first embodiment at the telephoto extremity shown in FIG. 3.
Figure 11B:
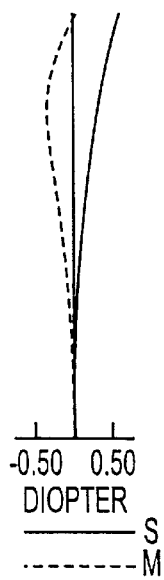
Figure 11C:
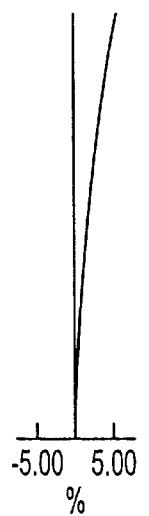
Figure 11D:
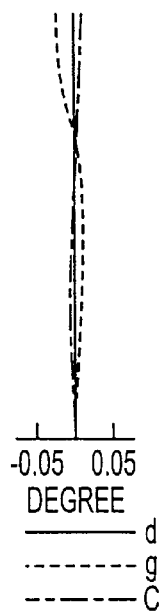
Figure 12A:
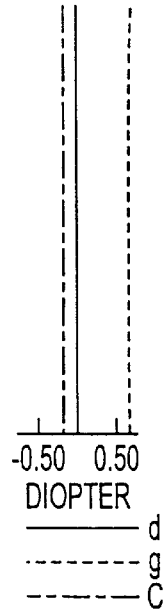
FIGS. 12A, 12B, 12C and 12D show aberration diagrams of the light paths from the pattern display surface (FIG. 4) as an object point to the eyepiece optical system via the half mirror surface, in the real-image zoom-finder optical system of the first embodiment.
Figure 12B:
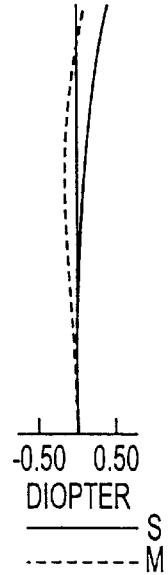
Figure 12C:
Figure 12D:
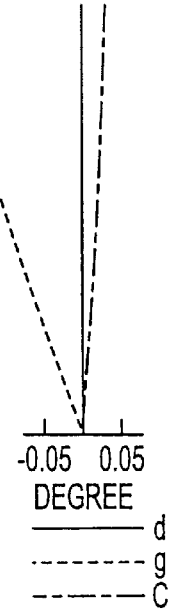

FIGS. 2 through 12 show the first embodiment of the real-image zoom-finder optical system. The basic lens arrangement of this embodiment is the same as that of FIG. 1 explained above. FIGS. 2 and 3 show the state of the real-image zoom-finder optical system at the wide-angle extremity and at the telephoto extremity, respectively. FIGS. 10A through 10D and 11A through 11D show aberrations of the optical systems shown in FIGS. 2 and 3, respectively. FIG. 4 is a schematic diagram showing light rays coming from the display pattern surface IE to the eyepoint via the half mirror surface HM, in the real-image zoom-finder optical system of FIGS. 2 and 3. FIGS. 12A, 12B, 12C and 12D show aberration diagrams of the light path from the pattern display surface IE, as an object point, to the eyepiece optical system via the half mirror surface HM shown in FIG. 4. FIGS. 5 through 7 show a prism provided in the real-image zoom-finder optical system of the first embodiment shown in FIGS. 2 through 4. FIG. 8 is a perspective view of the prism used in the first embodiment. FIG. 9 is a perspective view of the prism showing a rough finish or a black painted finish surfaces. Table 1 shows specific numerical data of the first embodiment.

TABLE 1

|  | WIDE | TELE | REFLECTION SYSTEM |
|---|---|---|---|
| $d_0 =$ | 2940.0 | 2940.0 | — |
| $\omega =$ | 26.5° | 13.0° | — |
| $\beta =$ | 11.0° | 11.0° | 11.0° |
| $\gamma =$ | 0.42 | 0.80 | — |
| m = | — | — | 11.6 |
| D = | −1.0 | −1.0 | −1.0 |
| h = | 4.30 |  |  |

| Surface No. | r | d (Wide) | d (Tele) | $n_d$ | $\nu_d$ |
|---|---|---|---|---|---|
| 1 | ∞ | 4.51 | 0.00 | — | — |
| 2* | −11.59 | 1.50 | — | 1.49176 | 57.3 |
| 3 | 20.47 | 16.32 | 8.27 | — | — |
| 4* | 8.16 | 3.51 | — | 1.49176 | 57.3 |
| 5 | −9.50 | 0.20 | — | — | — |
| 6 | −8.86 | 1.50 | — | 1.58547 | 29.8 |
| 7* | −28.50 | 0.70 | 13.25 | — | — |
| 8 | ∞ | 16.000 | — | — | — |
| 9 | 12.15 | 2.50 | — | 1.49176 | 57.3 |
| 10* | −29.18 | 4.60 | — | — | — |
| 11 | ∞ | 4.00 | — | — | — |
| 12 | ∞ | 7.87 | — | 1.49176 | 57.3 |
| 13 | ∞ | 13.83 | — | 1.49176 | 57.3 |
| 14 | ∞ | 1.20 | — | — | — |
| 15* | 23.08 | 2.60 | — | 1.49176 | 57.3 |
| 16 | −16.24 | 1.20 | — | — | — |
| 17 | −15.11 | 1.20 | — | 1.49176 | 57.3 |
| 18 | −17.29 | 12.00 | — | — | — |
| 19 | ∞ | −998.94 | — | — | — |

*designates the aspherical surface which is symmetrical with respect to the optical axis.

Aspherical surface data (the aspherical surface coefficients not indicated are zero (0.00)):

| Surface No. | K | A4 | A6 |
|---|---|---|---|
| 2 | 0.00 | $2.725 \times 10^{-4}$ | $-2.463 \times 10^{-6}$ |
| 4 | 0.00 | $6.713 \times 10^{-5}$ | $9.590 \times 10^{-6}$ |
| 7 | 0.00 | $4.115 \times 10^{-4}$ | $1.394 \times 10^{-5}$ |

-continued

| Surface No. | K | A4 | A6 |
|---|---|---|---|
| 10 | 0.00 | $4.558 \times 10^{-4}$ | $-5.333 \times 10^{-6}$ |
| 15 | 0.00 | $-7.489 \times 10^{-5}$ | $3.324 \times 10^{-7}$ |

In the first embodiment, one of the four reflection surfaces of the image-erecting optical system is positioned in front of the image forming plane IM as the mirror MR (reflection surface rf1). The remaining three reflection surfaces on the eyepiece optical system side (rf2, rf3, rf4) are arranged within the prism P.

The prism P is provided with a half mirror surface HM formed on the surface wherein a pair of prisms are cemented, and the pattern display surface IE formed on the light emitting surface. The half mirror surface HM, as shown in FIG. 8, is provided on a plane which includes the ridge line formed by the second and third reflection surfaces rf2 and rf3 and is perpendicular to the optical axis of the finder. The half mirror surface HM is made of thin metallic coating having well-known properties in which only a portion of visible wavelength is reflected. As examples of the display information, FIG. 8 shows a pattern display surface IE on prism P having thin metallic film in the form of a field frame W1 (a larger frame) and an AF focusing frame W2 (a smaller frame) which is vaporized thereon. The prism P is comprised of two small prisms: a small prism P1 which includes the incident surface pr1, the reflection surface rf2 and the first-half of the cemented half mirror surface HM; and a small prism P2 which includes the remaining half of the cemented half mirror surface HM, reflection surfaces rf3 and rf4, and the emitting surface pr2. The Prisms P1 and P2 can be cemented together after the above-mentioned thin metallic film is vaporized on the half mirror surface HM of the prism P2.

As shown in FIG. 4, a portion of the incident light rays in the direction from the objective optical system to the eyepiece optical system are reflected from the pattern display surface IE (i.e., the frames W1 and W2) toward the object, and subsequently are again reflected by the half mirror HM in the direction of the eyepiece optical system. As shown in FIG. 8, the incident light rays "a" that come via the objective optical system reach the viewer's (user's) eye from A1 via each incident surface pr1, reflective surfaces rf2, rf3, rf4, emitting surface pr2, and the eyepiece optical system. At the same time, the light rays "b" which are a portion of the light rays "a" reflected from the display information point B1 on the pattern display surface IE toward the object, are reflected by the reflection surfaces rf4 and rf3, and again reflected by the point B2 on the half mirror surf ace HM; and subsequently, the light rays "b" reach the viewer's (user's) eye via the surfaces rf3, rf4 and pr2, and the eyepiece optical system.

The positions of the virtual-image plane of the pattern display surface by the half mirror surface and the image forming plane of the objective optical system are optically equivalent with respect to the eyepiece optical system. The real image formed on the image forming plane IM via the objective optical system and the virtual image (formed by the half mirror surface HM) of the pattern on the pattern display surface IE are viewed by the user with substantially the same diopter.

The eyepiece optical system includes a lens element L5 whereby the diopter value of the real image formed on the image forming plane IM by the objective optical system and the diopter value of the virtual image of the pattern reflected by the half mirror surface HM can be adjusted by moving the lens element L5 in the direction of the optical axis so that a suitable diopter is obtained for the user. In other words, this arrangement is preferable since diopter values of both the real and virtual images can be simultaneously varied by moving the lens element L5.

At least between the half mirror surface HM and the pattern display surface IE, along the optical axis, it is preferable to form harmful-light-preventing surfaces B on edge surfaces of the prism, having a rough finish or a black painted finish. As shown in FIG. 9, the edge surfaces are defined as the surfaces of the prism wherein the substantial light paths do not pass through. Consequently, stray light is effectively prevented, and occurrence of ghost images can be substantially prevented.

In the first embodiment, the half mirror surface HM is located at a position 7.87 millimeters from the incident surface pr1 of the prism P; thus satisfying conditions (1) through (3).

Second Embodiment

Figure 13:
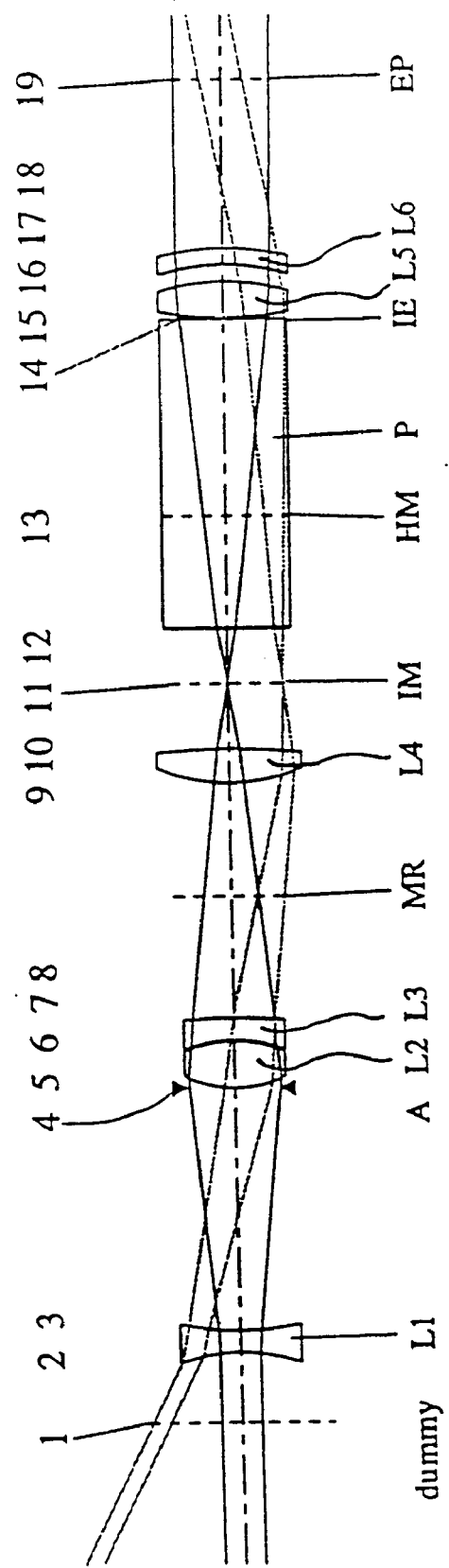
FIG. 13 is a schematic drawing of the second embodiment of the real-image zoom-finder optical system according to the present invention at the wide-angle extremity.
Figure 14:
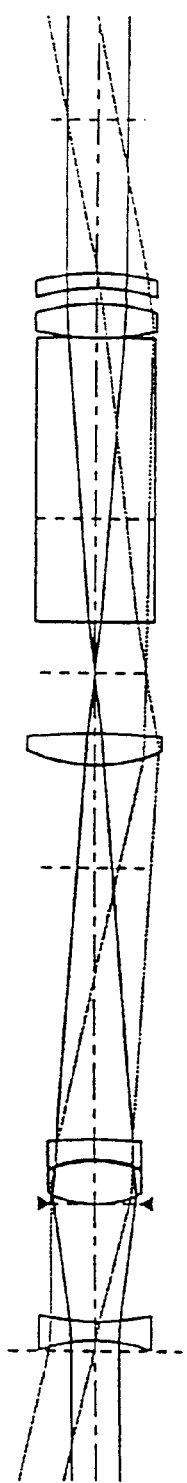
FIG. 14 is a schematic drawing showing the second embodiment of the real-image zoom-finder optical system at the telephoto extremity according to the present invention.
Figure 15:
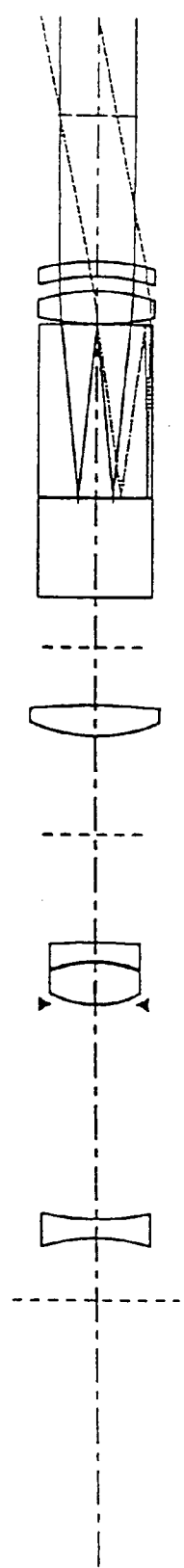
FIG. 15 is a schematic drawing showing light paths coming from the pattern display surface to the eyepoint via the half mirror surface in the real-image zoom-finder optical system of FIGS. 13 and 14.
Figure 16:
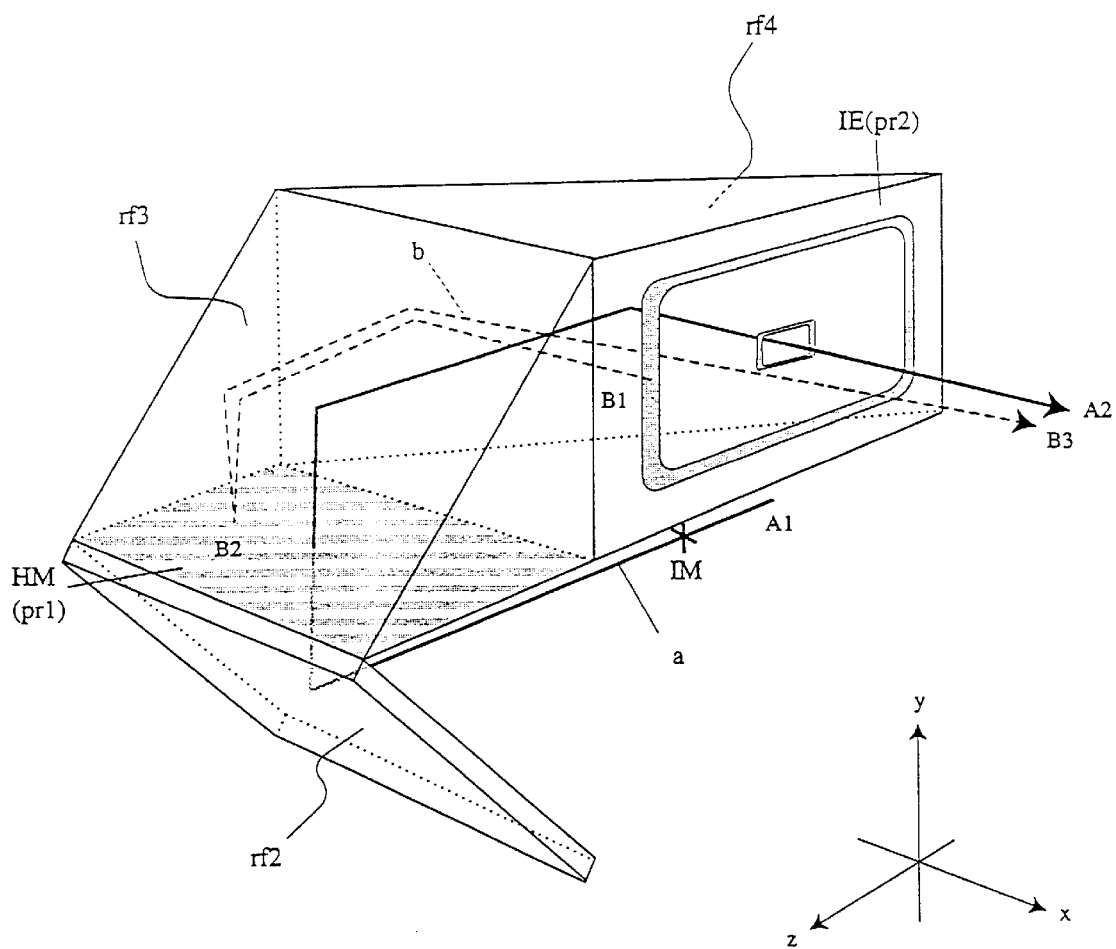
FIG. 16 is a perspective view of a prism utilized in the second embodiment shown in FIGS. 13 through 15.
Figure 17A:
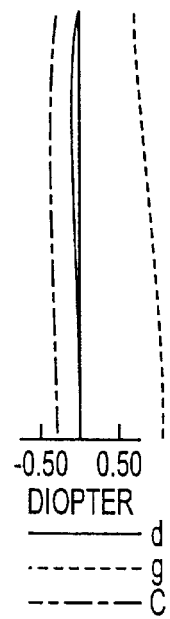
FIGS. 17A, 17B, 17C and 17D show aberration diagrams of the real-image zoom-finder optical system of the second embodiment at the wide-angle extremity shown in FIG. 13.
Figure 17B:
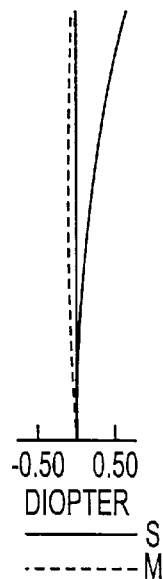
Figure 17C:
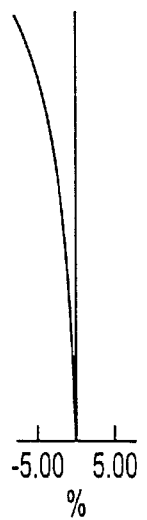
Figure 17D:
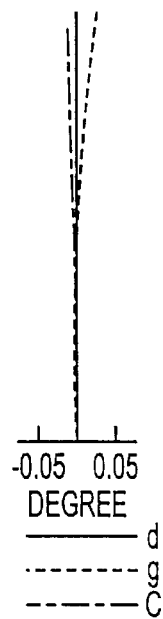
Figure 18A:
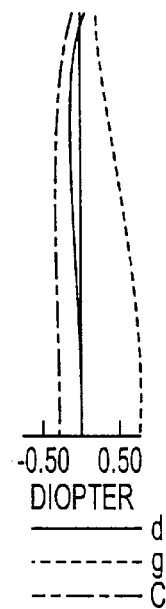
FIGS. 18A, 18B, 18C and 18D show aberration diagrams of the second embodiment at the telephoto extremity shown in FIG. 14.
Figure 18B:
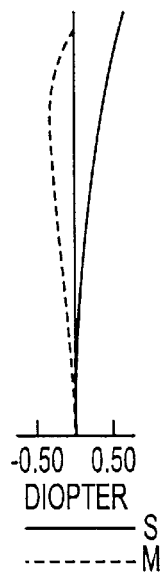
Figure 18C:
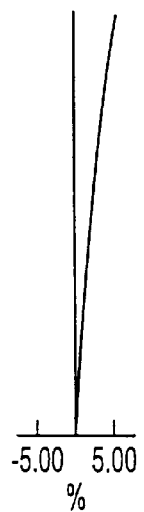
Figure 18D:
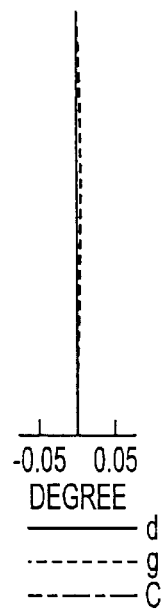
Figure 19A:
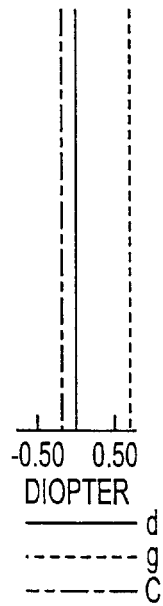
FIGS. 19A, 19B, 19C and 19D show aberration diagrams of the light paths from the pattern display surface (FIG. 15) as an object point to the eyepiece optical system via the half mirror surface, in the real-image zoom-finder optical system of the second embodiment.
Figure 19B:
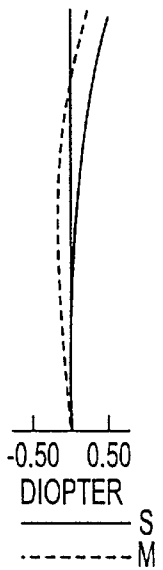
Figure 19C:
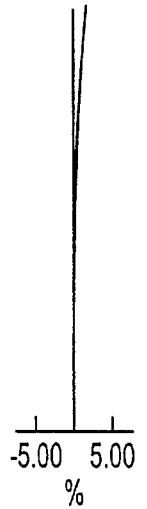
Figure 19D:
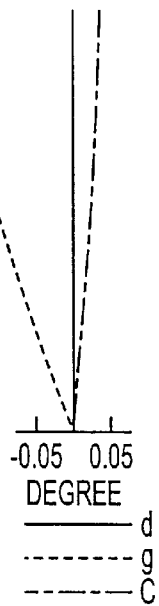

FIGS. 13 through 19 show the second embodiment of the real-image zoom-finder optical system. The basic lens arrangement of this embodiment is the same as that of FIG. 1 explained above. FIGS. 13 and 14 show the state of the real-image zoom-finder optical system at the wide-angle extremity and at the telephoto extremity,respectively. FIGS. 17A through 17D and 18A through 18D show aberrations of the optical systems shown in FIGS. 13 and 14, respectively. FIG. 15 is a schematic diagram showing light rays coming from the display pattern surface IE to the eyepoint via the half mirror surface HM, in the real-image zoom-finder optical system of FIGS. 13 and 14. FIGS. 19A, 19B, 19C and 19D show aberration diagrams of the light path from the pattern display surface IE as the object point to the eyepiece optical system via the half mirror surface HM shown in FIG. 15. The prism shown in FIG. 8 of the first embodiment is also used in the second embodiment. FIG. 16 is a perspective view of the combination of the prism and a mirror instead of the single prism shown in FIG. 8. Table 2 shows specific numerical data of the second embodiment.

TABLE 2

|  | WIDE | TELE | REFLECTION SYSTEM |  |  |
|---|---|---|---|---|---|
| $d_0 =$ | 2940.0 | 2940.0 | — |  |  |
| $\omega =$ | 26.6° | 13.1° | — |  |  |
| $\beta =$ | 11.0° | 11.0° | 11.0° |  |  |
| $\gamma =$ | 0.42 | 0.79 | — |  |  |
| m = | — | — | 12.2 |  |  |
| D = | −1.0 | −1.0 | −1.0 |  |  |
| h = | 4.30 |  |  |  |  |

| Surface No. | r | d (Wide) | d (Tele) | $n_d$ | $v_d$ |
|---|---|---|---|---|---|
| 1 | ∞ | 5.10 | 0.85 | — | — |
| 2* | −11.32 | 1.50 | — | 1.49176 | 57.3 |
| 3 | 19.21 | 17.27 | 9.22 | — | — |
| 4 | ∞ | 0.00 | — | — | — |
| 5* | 8.18 | 3.29 | — | 1.49176 | 57.3 |
| 6 | −9.50 | 0.20 | — | — | — |
| 7 | −8.85 | 1.50 | — | 1.58547 | 29.8 |
| 8* | −29.21 | 16.70 | 29.00 | — | — |
| 9 | 12.38 | 2.50 | — | 1.49176 | 57.3 |
| 10* | −28.21 | 4.74 | — | — | — |
| 11 | ∞ | 4.00 | — | — | — |
| 12 | ∞ | 7.87 | — | 1.49176 | 57.3 |
| 13 | ∞ | 13.83 | — | 1.49176 | 57.3 |
| 14 | ∞ | 0.10 | — | — | — |
| 15* | 23.07 | 2.60 | — | 1.49176 | 57.3 |

TABLE 2-continued

| 16 | −14.97 | 1.20 | — | — | — |
|---|---|---|---|---|---|
| 17 | −15.13 | 1.20 | — | 1.49176 | 57.3 |
| 18 | −17.26 | 12.00 | — | — | — |
| 19 | ∞ | −998.38 | — | — | — |

*designates the aspherical surface which is symmetrical with respect to the optical axis.

Aspherical surface data (the aspherical surface coefficients not indicated are zero (0.00)):

| Surface No. | K | A4 | A6 |
|---|---|---|---|
| 2 | 0.00 | $2.861 \times 10^{-4}$ | $-2.679 \times 10^{-6}$ |
| 5 | 0.00 | $8.466 \times 10^{-5}$ | $1.133 \times 10^{-5}$ |
| 8 | 0.00 | $4.133 \times 10^{-4}$ | $1.610 \times 10^{-5}$ |
| 10 | 0.00 | $4.717 \times 10^{-4}$ | $-5.434 \times 10^{-6}$ |
| 15 | 0.00 | $-8.842 \times 10^{-5}$ | $3.807 \times 10^{-7}$ |

In the second embodiment, the light emitting surface of the prism P (i.e., the pattern display surface IE) and the surface (of the eyepiece optical system) closest to the object are closer to each other than those of the first embodiment. Furthermore, the focal length of the eyepiece optical system is shorter than in the first embodiment. Accordingly, when foreign matter, stuck to any optical element close to the image forming plane IM of the objective optical system, is observed through the eyepiece optical system, the diopter is considerably different from a suitable (standard) diopter for viewing, so that the foreign matter is made even less apparent. In the first and second embodiments, the image-erecting optical system behind the image forming plane IM of the objective optical system is composed of the prism P shown in FIG. 8. By obtaining a reduced distance between the incident surface (pr1) and the second reflection surface (rf2) of the prism P, a mirror can be used for the second reflective surface (rf2) as shown in FIG. 16.

In the second embodiment, the half mirror surface HM is located at a position 7.87 millimeters from the incident surface pr1 of the prism P; thus satisfying conditions (1) through (3).

Third Embodiment

Figure 21:
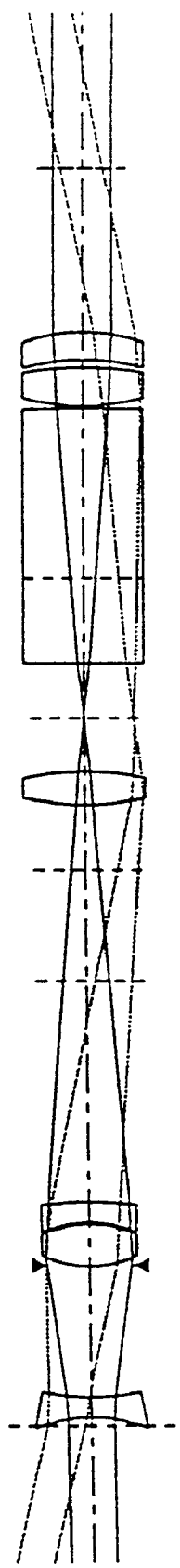
FIG. 21 is a schematic drawing showing the third embodiment of the real-image zoom-finder optical system at the telephoto extremity according to the present invention.
Figure 22:
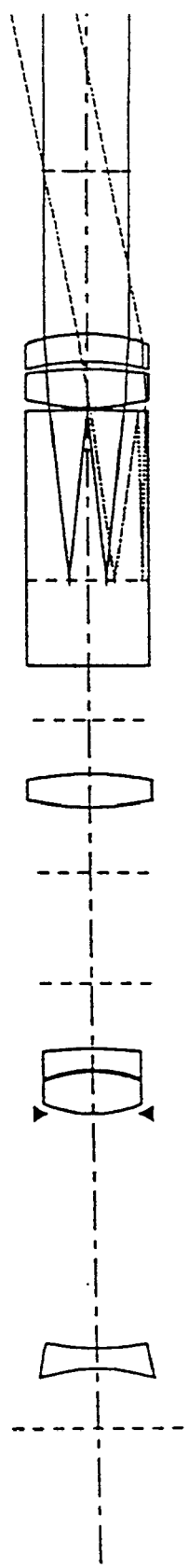
FIG. 22 is a schematic drawing showing light paths coming from the pattern display surface to the eyepoint via the half mirror surface in the real-image zoom-finder optical system of FIGS. 20 and 21.
Figure 23:
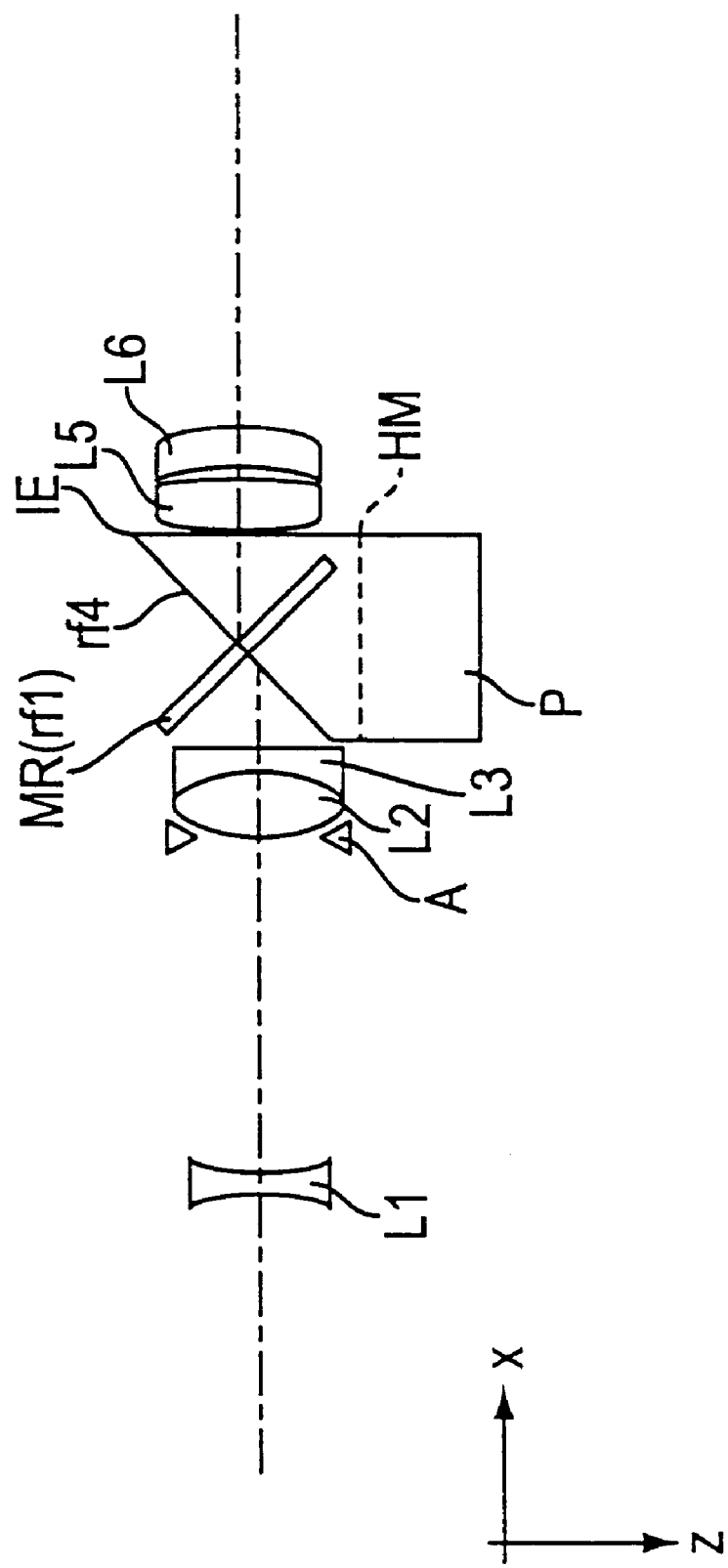
FIG. 23 is a plan view showing a prism provided in the real-image zoom-finder optical system of the third embodiment shown in FIGS. 20 through 22.
Figure 24:
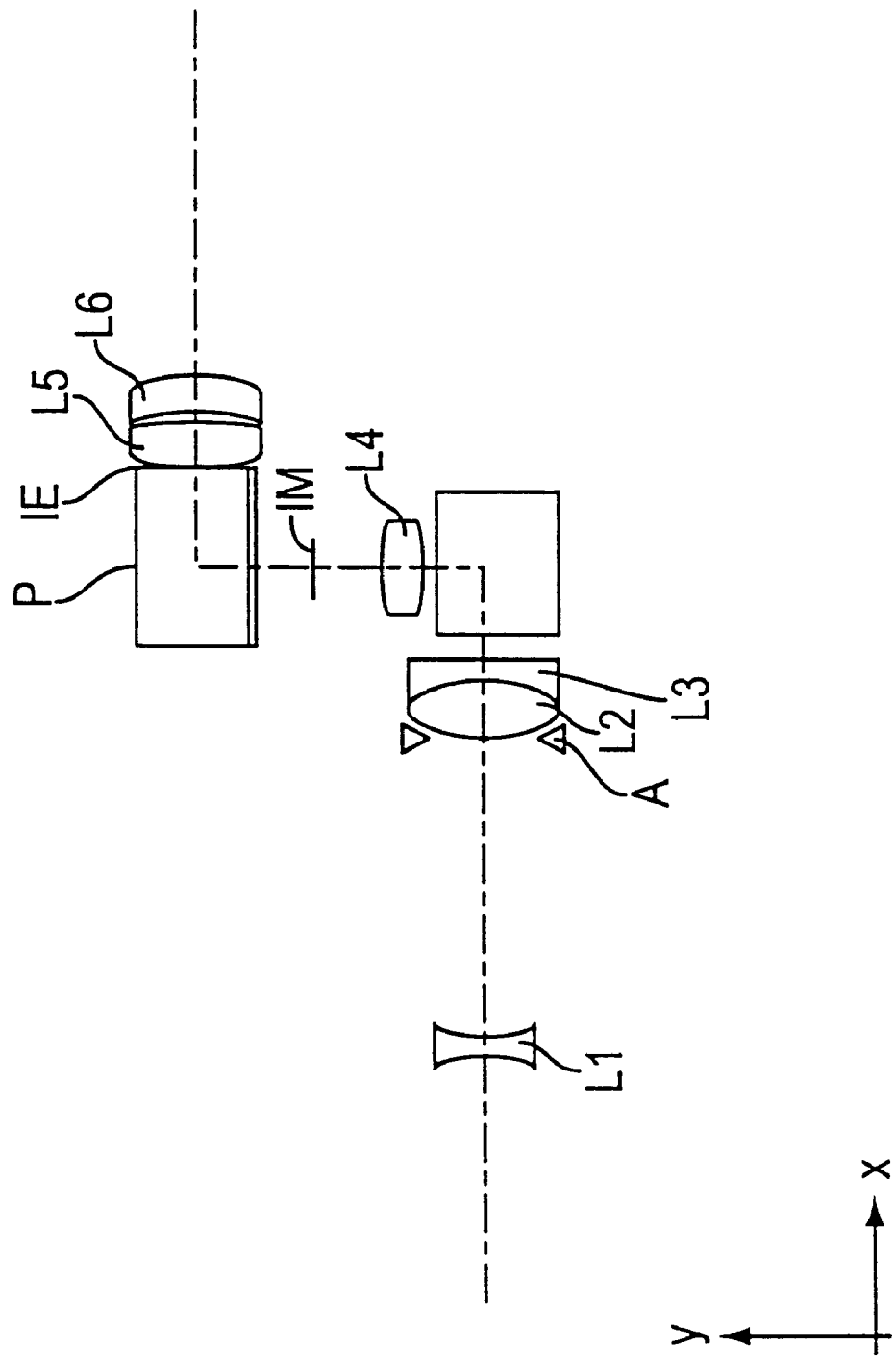
FIG. 24 is a side elevation of the real-image zoom-finder optical system shown in FIG. 23.
Figure 26:
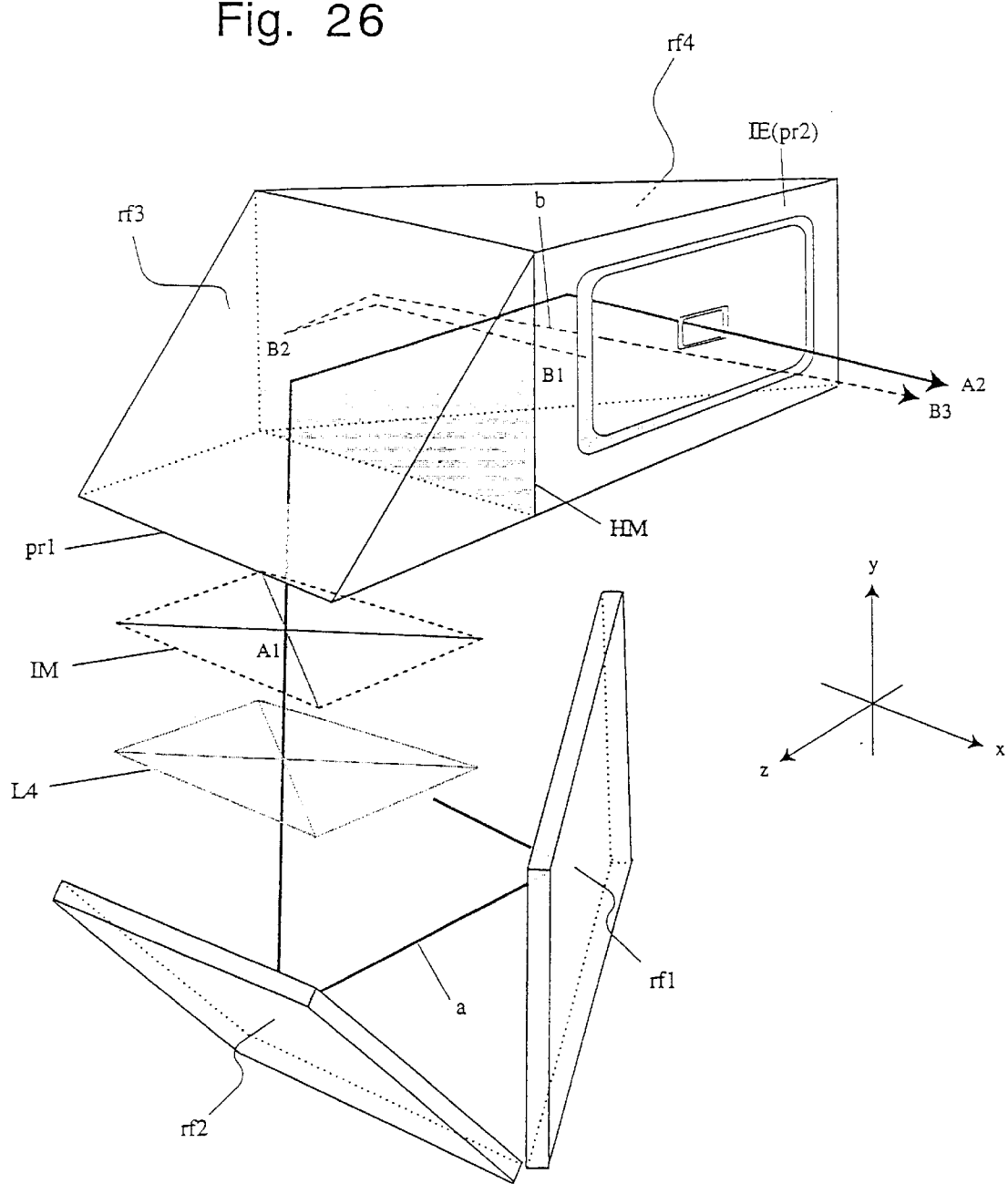
FIG. 26 is a perspective view of the prism used in the third embodiment of FIGS. 20 through 25.
Figure 27A:
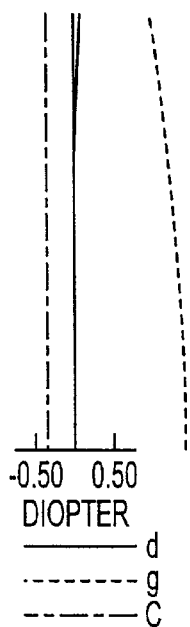
FIGS. 27A, 27B, 27C and 27D show aberration diagrams of the real-image zoom-finder optical system of the third embodiment at the wide-angle extremity shown in FIG. 20.
Figure 27B:
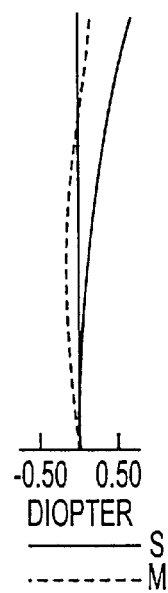
Figure 27C:
Figure 27D:
Figure 28A:
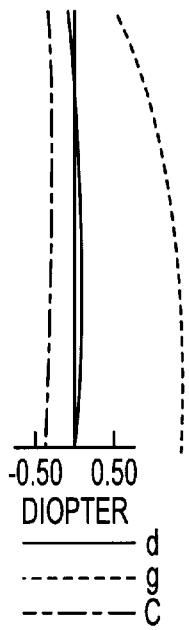
FIGS. 28A, 28B, 28C and 28D show aberration diagrams of the third embodiment at the telephoto extremity shown in FIG. 21.
Figure 28B:
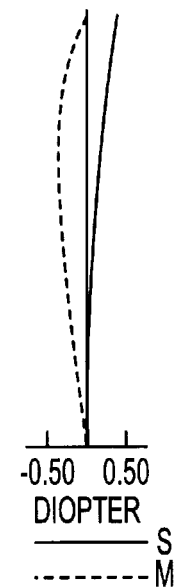
Figure 28C:
Figure 28D:
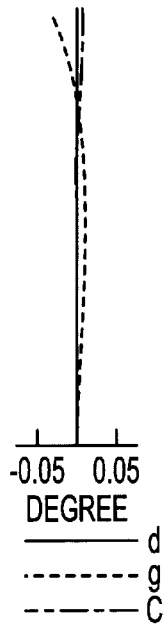
Figure 29A:
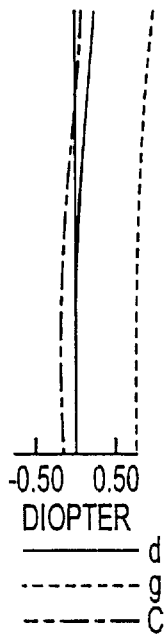
FIGS. 29A, 29B, 29C and 29D show aberration diagrams of the light paths from the pattern display surface (FIG. 22) as an object point to the eyepiece optical system via a half mirror surface, in the real-image zoom-finder optical system of the third embodiment
Figure 29B:
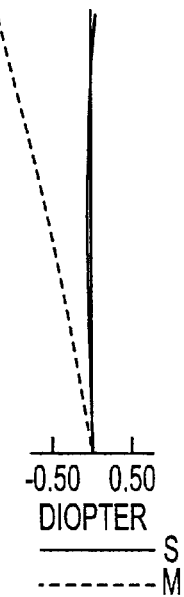
Figure 29C:
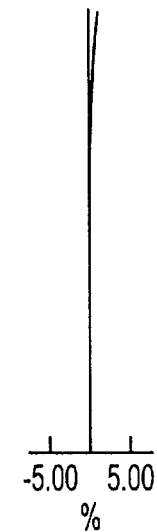
Figure 29D:
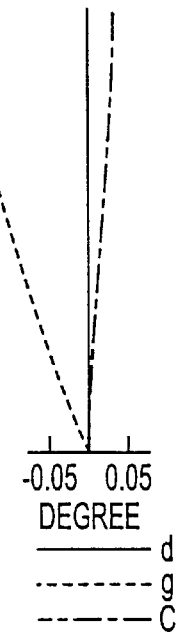

FIGS. 20 through 29 show the third embodiment of the real-image zoom-finder optical system. The basic lens arrangement of this embodiment is the same as that of FIG. 1 explained above except for the following points: (i) two reflection surfaces of the image-erecting optical system are provided on either side (front and back sides) of the image forming plane IM of the objective optical system, (ii) the two reflective surfaces in front of the image forming plane IM are mirrors; and (iii) the half mirror surface HM is located between the third and fourth reflective surfaces (rf3 and rf4), and is perpendicular to the optical axis. As shown in FIG. 26 by which the following explanations will be given, the incident light rays "a" reach the viewer's (user's) eye from A1 via each incident surface pr1, reflection surfaces rf3, rf4, emitting surface pr2 and the eyepiece optical system. At the same time, the light rays "b" which are a portion of the light rays "a" reflected from the display information point B1 on the pattern display surface IE toward the object, are reflected by the reflection surface rf4, and reflected by the point B2 on the half mirror surface HM; and subsequently, the light rays "b"0 reach the viewer's (user's) eye via the surfaces rf4 and pr2, and the eyepiece optical system. FIGS. 20 and 21 show the state of the real-image zoom-finder optical system respectively at the wide-angle extremity and at the telephoto extremity. FIGS. 27A through 27D and 28A through 28D show aberrations of the optical systems shown in FIGS. 20 and 21, respectively. FIG. 22 is a schematic diagram showing light rays coming from the display pattern surface IE to the eyepoint via the half mirror surface HM, in the real-image zoom-finder optical system of FIGS. 20 and 21. FIGS. 29A, 29B, 29C and 29D show aberration diagrams of the light path from the pattern display surface IE as the object point to the eyepiece optical system via the half mirror surface HM shown in FIG. 22. FIGS. 23 through 25 show a prism and mirrors provided in the real-image zoom-finder optical system of the third embodiment. FIG. 26 is a perspective view of the prism and the mirrors used in the third embodiment. Table 3 shows specific numerical data of the first embodiment.

TABLE 3

|  | WIDE | TELE | REFLECTION SYSTEM |  |  |
| --- | --- | --- | --- | --- | --- |
| $d_0$ = | 2940.0 | 2940.0 | — |  |  |
| $\omega$ = | 26.0° | 13.3° | — |  |  |
| $\beta$ = | 11.0° | 11.0° | 11.0° |  |  |
| $\gamma$ = | 0.42 | 0.79 | — |  |  |
| m = | — | — | 13.3 |  |  |
| D = | −1.0 | −1.0 | −1.0 |  |  |
| h = |  | 4.13 |  |  |  |
| Surface No. | r | d (Wide) | d (Tele) | $n_d$ | $\nu_d$ |
| 1 | ∞ | 4.51 | 0.59 | — | — |
| 2* | −9.93 | 1.50 | — | 1.49176 | 57.3 |
| 3 | 16.45 | 17.23 | 9.82 | — | — |
| 4 | ∞ | 0.00 | — | — | — |
| 5* | 8.71 | 3.01 | — | 1.49176 | 57.3 |
| 6 | −9.30 | 0.20 | — | — | — |
| 7 | −8.83 | 1.50 | — | 1.58547 | 29.8 |
| 8* | −21.74 | 17.70 | 29.02 | — | — |
| 9* | 14.25 | 2.50 | — | 1.49176 | 57.3 |
| 10 | −20.25 | 4.00 | — | — | — |
| 11 | ∞ | 4.00 | — | — | — |
| 12 | ∞ | 6.27 | — | 1.49176 | 57.3 |
| 13 | ∞ | 12.23 | — | 1.49176 | 57.3 |
| 14 | ∞ | 0.20 | — | — | — |
| 15* | 15.33 | 2.81 | — | 1.49176 | 57.3 |
| 16 | −28.76 | 0.61 | — | — | — |
| 17 | −15.82 | 2.00 | — | 1.49176 | 57.3 |
| 18 | −13.09 | 12.00 | — | — | — |
| 19 | ∞ | −998.94 | — | — | — |

*designates the aspherical surface which is symmetrical with respect to the optical axis.

Aspherical surface data (the aspherical surface coefficients not indicated are zero (0.00)):

| Surface No. | K | A4 | A6 |
| --- | --- | --- | --- |
| 2 | 0.00 | $5.005 \times 10^{-4}$ | $-6.183 \times 10^{-6}$ |
| 5 | 0.00 | $3.093 \times 10^{-6}$ | $1.088 \times 10^{-5}$ |
| 8 | 0.00 | $2.923 \times 10^{-4}$ | $1.428 \times 10^{-5}$ |
| 9 | 0.00 | $-5.102 \times 10^{-4}$ | $2.543 \times 10^{-6}$ |
| 15 | 0.00 | $-1.648 \times 10^{-4}$ | $4.956 \times 10^{-7}$ |

The behavior of the light rays that are incident on the eyepiece optical system from the objective optical system will be herein described in accordance with FIG. 26. The light rays "a" that come via the objective optical reach the viewer's (user's) eye from A1 via each incident surface pr1, reflection surfaces rf3, rf4, emitting surface pr2 and the eyepiece optical system. At the same time, the light rays "b" which are a portion of the light rays "a" reflected from the display information point B1 on the pattern display surface IE toward the object are reflected by the reflection surfaces rf4, and again reflected by the point B2 on the half mirror surface HM; and subsequently, the light rays "b" reach the viewer's (user's) eye via the surfaces rf4 and pr2, and the eyepiece optical system.

In this third embodiment, mirrors constitute the reflection surfaces that are on the object-side of the image forming plane IM; however, these reflection surfaces can be formed by a prism. Furthermore, the half mirror surface HM is located at a position 6.27 millimeters from the incident surface pr1 of the prism P, thus satisfying conditions (1) (2) and (3).

The numerical values of each condition for each embodiment are listed in Table 4. All embodiments satisfy conditions (1), (2) and (3).

TABLE 4

| Condition | (1) | (2) | (3) |
| --- | --- | --- | --- |
| Embodiment 1 | 0.06 | 0.53 | 2.44 |
| Embodiment 2 | 0.005 | 0.50 | 2.18 |
| Embodiment 3 | 0.01 | 0.51 | 2.03 |

As can be understood from the above, foreign matter, which may stick to any optical elements constituting the objective optical system and the image-erecting optical system, or to the display member, is not apparent in the finder field of view; therefore, a real-image finder having reliable high quality viewing can be attained.

What is claimed is:

1. A real-image finder optical system comprising:

an objective optical system having positive power;

an image-erecting optical system which erects an inverted image formed by said objective optical system; and an eyepiece optical system for viewing said erect image formed by said image-erecting optical system, in this order from an object;

wherein said image-erecting optical system comprises:

a pattern display surface having a reflective pattern thereon, said pattern display surface being provided on the side of said eyepiece optical system behind an image forming plane of said objective optical system;

a half mirror surface being provided on the side of the object with respect to said pattern display surface, said half mirror surface being arranged to transmit a portion of light rays incident from the object, and reflect light rays which have been reflected by said pattern display surface; and wherein said real-image finder optical system is arranged to provide a real image of the object formed through said objective optical system and a virtual image of a pattern on said pattern display surface formed by an optical system including said half mirror surface so that an operator can simultaneously view both said real image of the object and said virtual image of said pattern on said pattern display surface through said eyepiece optical system; said real-image finder optical system satisfies the following condition:

wherein $d_1$ designates the equivalent air thickness along the optical axis from said pattern display surface to the surface of said eyepiece optical system closest to the object; and $f_e$ designates the focal length of said eyepiece optical lens system.

2. The real-image finder optical system according to claim 1, wherein optical elements constituting said objective optical system are provided at positions away from said image forming plane of said objective optical system, and optical elements constituting said image-erecting optical system are provided at positions away from said image forming plane of said objective optical system; and wherein a virtual-image plane of said pattern display surface by said half mirror surface and said image forming plane of said objective optical system are located at optically equivalent positions with respect to said eyepiece optical system.

3. The real-image finder optical system according to claim 2, wherein said real-image finder optical system further satisfies the following condition:

$$0.4 \leq d_2/d_3 \leq 0.6$$

wherein $d_2$ designates the equivalent air thickness along the optical axis from said half mirror surface to the surface of said eyepiece optical system closest to the object; and $d_3$ designates the equivalent air thickness along the optical axis from said image forming plane of said objective optical system to the surface of said eyepiece optical system closest to the object.

4. The real-image finder optical system according to claim 1, wherein said image-erecting optical system comprises a Porro type image-erecting optical system in which said light rays incident from the object are reflected twice in the vertical direction and reflected twice in the horizontal direction so that said inverted image formed by said objective optical system is erected, said image-erecting optical system comprises a prism having a plurality of refection surfaces on the side of said eyepiece optical system behind said image forming plane of said objective optical system, and said pattern display surface is provided on a surface of said prism, closest to said eyepiece optical system, from which said light rays are emitted.

5. The real-image finder optical system according to claim 4, wherein said prism of said image-erecting optical system comprises harmful-light-preventing surfaces being provided with either a rough finish or a black painted finish on edge surfaces at least between said half mirror surface and said pattern display surface along the optical axis.

6. The real-image finder optical system according to claim 1, wherein the surface of said half mirror surface is a plane.

7. The real-image finder optical system according to claim 1, wherein said image-erecting optical system comprises a prism having three reflection surfaces on the side of said eyepiece optical system behind said image forming plane of said objective optical system, said half mirror surface is formed, between the first and second reflection surfaces, on a plane which is perpendicular to the optical axis; wherein said real-image finder optical system satisfies the following condition:

$$1.5 \leq d_2/h \leq 3.5$$

wherein

"h" designates the longest distance from the optical axis to the most outer periphery of the effective area of the emitted bundle of light rays at the emitting surface of said prism closest to said eyepiece optical system.

8. The real-image finder optical system according to claim 7, wherein said half mirror surface includes the ridge line of the first and second reflection surfaces.

9. The real-image finder optical system according to claim 1, wherein said image-erecting optical system comprises a prism having two reflective surfaces on the side of said eyepiece optical system behind said image forming plane of said objective optical system; and wherein said half mirror surface is formed, between the first and the second reflection surfaces, on a plane which is perpendicular to the optical axis, and said real-image finder optical system satisfies the following condition:

$$1.5 \leq d_2/h \leq 3.5$$

wherein

"h" designates the longest distance from the optical axis to the most outer periphery of the effective area of the emitted bundle of light rays at the emitting surface of the prism closest to the eyepiece optical system.

10. The real-image finder optical system according to claim 9, wherein said half mirror surface is placed on a position which includes the ridge lines formed by said first reflective surface and an edge surface formed by said second reflective surface and a light emitting surface closest to said eyepiece optical system.

11. The real-image finder optical system according to claim 1, wherein said half mirror surface is formed on a cemented surface of a pair of prisms.

* * * * *

UNITED STATES PATENT AND TRADEMARK OFFICE
CERTIFICATE OF CORRECTION

PATENT NO. : 6,115,182
DATED : September 5, 2000
INVENTOR(S) : S. HASUSHITA

It is certified that error appears in the above-identified patent and that said Letters Patent is hereby corrected as shown below:

On the title page, item: [54], Title of the Invention, change "REAL-TIME" to ---REAL-IMAGE---.

Signed and Sealed this

Eighth Day of May, 2001

Attest:

NICHOLAS P. GODICI

Attesting Officer      *Acting Director of the United States Patent and Trademark Office*